(12) United States Patent
Fukaya et al.

(10) Patent No.: US 8,944,228 B2
(45) Date of Patent: Feb. 3, 2015

(54) HYDRAULIC CLUTCH CONTROL DEVICE OF VEHICLE POWER UNIT

(75) Inventors: Kazuyuki Fukaya, Wako (JP); Masahiko Tsuchiya, Wako (JP); Masazumi Naito, Wako (JP); Toshimasa Mitsubori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 256 days.

(21) Appl. No.: 13/552,974

(22) Filed: Jul. 19, 2012

(65) Prior Publication Data

US 2013/0037372 A1 Feb. 14, 2013

(30) Foreign Application Priority Data

Aug. 9, 2011 (JP) ................................. 2011-173554

(51) Int. Cl.
| | | |
|---|---|---|
| F16D 25/10 | (2006.01) | |
| F16D 25/12 | (2006.01) | |
| B60K 23/02 | (2006.01) | |
| F16D 21/06 | (2006.01) | |
| F16D 48/02 | (2006.01) | |
| F02B 61/02 | (2006.01) | |

(52) U.S. Cl.
CPC ............ F16D 21/06 (2013.01); F16D 48/0206 (2013.01); F02B 61/02 (2013.01); F16D 2021/0623 (2013.01); F16D 2021/0653 (2013.01); F16D 2021/0661 (2013.01); F16D 2048/0209 (2013.01); F16D 2300/26 (2013.01)
USPC ................... 192/48.614; 192/85.63; 180/230

(58) Field of Classification Search
CPC .......... F16D 48/062; F16D 2021/0623; F16D 2021/0653; F02B 61/06
USPC ......................... 192/48.601, 48.614; 180/230
See application file for complete search history.

(56) References Cited

U.S. PATENT DOCUMENTS

| | | | | |
|---|---|---|---|---|
| 2008/0053775 | A1* | 3/2008 | Tsukada et al. | 192/3.57 |
| 2008/0128239 | A1* | 6/2008 | Ogasawara | 192/85 R |
| 2010/0243396 | A1* | 9/2010 | Mizuno et al. | 192/48.603 |
| 2011/0220057 | A1* | 9/2011 | Fujimoto et al. | 123/197.5 |
| 2011/0233022 | A1* | 9/2011 | Fujimoto et al. | 192/48.601 |
| 2012/0247904 | A1* | 10/2012 | Mitsubori et al. | 192/48.601 |

FOREIGN PATENT DOCUMENTS

JP 2010-255840 A 11/2010

* cited by examiner

*Primary Examiner* — Richard Lorence
(74) *Attorney, Agent, or Firm* — Rankin, Hill & Clark LLP

(57) ABSTRACT

A hydraulic clutch control device of a vehicle power unit in which the oil pressure control valve is prevented from being exposed above the oil level even when a vehicle body inclines frontward or rearward. A housing chamber housing an actuator is formed in a housing chamber forming body attached to an engine main body and an oil pressure control valve partially facing the housing chamber is supported by the housing chamber forming body. An oil return hole used to return excess hydraulic oil from the housing chamber into the engine main body is provided in the housing chamber forming body to communicate with an upper portion of the housing chamber at an end portion of the housing chamber on a side close to the oil pressure control valve.

19 Claims, 15 Drawing Sheets

HYDRAULIC CLUTCH CONTROL DEVICE OF VEHICLE POWER UNIT

BACKGROUND OF THE INVENTION

1. Field of the Invention

The present invention relates to a hydraulic clutch control device of a vehicle power unit.

2. Description of Related Art

Japanese Patent Application Publication No. 2010-255840 discloses a structure including an oil pressure control valve to control an oil pressure of a hydraulic clutch inserted in a power transmission system of a power unit; and an actuator to drive the oil pressure control valve, the oil pressure control valve and the actuator being housed in a housing chamber filled with a hydraulic oil so as to prevent operating noise of the oil pressure control valve and the actuator from leaking to the outside.

In the structure disclosed in Japanese Patent Application Publication No. 2010-255840, the housing chamber is formed to be quite larger than the whole of the oil pressure control valve and the actuator, and the whole of the oil pressure control valve and the actuator is immersed deep in the hydraulic oil. This prevents the oil pressure control valve from being exposed above the oil level even when part of the housing chamber is not filled with the hydraulic oil, which flows out more than necessary from an oil return hole communicating with an upper portion of the housing chamber, because the vehicle body inclines frontward or rearward when the vehicle climbs or descends a slope while travelling. However, in order to provide such a large housing chamber in the engine main body, a relatively large space needs to be secured in the engine main body. This may not only restrict the disposing position but may also lead to increase in size of the engine main body.

SUMMARY OF THE INVENTION

The present invention has been made in view of the situations described above and an object is to provide a hydraulic clutch control device of a vehicle power unit which is capable of suppressing exposure of an oil pressure control valve above an oil level of a hydraulic oil even when a vehicle body inclines frontward or rearward, while avoiding an increase in size of an engine main body.

For the purpose of solving the above-mentioned problems, a first aspect of the present invention provides a hydraulic clutch control device of a vehicle power unit in which: a hydraulic clutch is inserted in a power transmission system of a power unit including an internal combustion engine having a engine main body mounted on a vehicle-body frame; an oil pressure control valve and an actuator are disposed in the engine main body, the oil pressure control valve being capable of controlling an oil pressure of the hydraulic clutch and arranged to have an operating direction extending in a front-rear direction of the vehicle-body frame, the actuator being serially connected to the oil pressure control valve in the operating direction to drive the oil pressure control valve; and at least the actuator out of the oil pressure control valve and the actuator is housed in a housing chamber filled with a hydraulic oil, wherein the housing chamber housing the actuator is formed in a housing chamber forming body attached to the engine main body and the oil pressure control valve partially facing the housing chamber is supported by the housing chamber forming body, and an oil return hole used to return an excessive portion of the hydraulic oil from the housing chamber into the engine main body is provided in the housing chamber forming body to communicate with an upper portion of the housing chamber at an end portion of the housing chamber on a side close to the oil pressure control valve.

According to the first aspect of the present invention, the actuator is housed in the housing chamber and the oil pressure control valve is arranged to have the operating direction extend in the front-rear direction of the vehicle-body frame. The actuator is serially arranged in the operating direction and connected to the oil pressure control valve to drive the oil pressure control valve. In addition, the oil return hole is disposed to communicate with the upper portion of the housing chamber at the end portion of the housing chamber on the side close to the oil pressure control valve. Accordingly, an oil level of the hydraulic oil is less likely to be low on the side close to the oil pressure control valve even when the vehicle body inclines frontward or rearward. Hence, exposure of the oil pressure control valve above the oil level can be suppressed without increasing the size of the housing chamber. Thus, an increase in size of the engine main body can be avoided.

A second aspect of the present invention is such that, in addition to the first aspect, the housing chamber forming body includes a supporting holder and a cover member. The supporting holder is attached to the engine main body with the oil pressure control valve fitted to and supported by the supporting holder. The cover member is attached to the supporting holder to form the housing chamber between the cover member and the supporting holder. Part of the supporting holder is cut away to form the oil return hole opening upward and laterally in an upper portion of the supporting holder.

According to the second aspect of the present invention, the housing chamber is formed between the supporting holder attached to the engine main body with the oil pressure control valve fitted to and supported by the supporting holder, and part of the supporting holder is cut away to form the oil return hole opening upward and laterally in an upper portion of the supporting holder. Accordingly, the oil return hole can be easily formed by machining or molding.

A third aspect of the present invention is such that, in addition to the second aspect, the oil pressure control valve includes a valve housing fitted and fixed to the supporting holder and a spool valve body slidably fitted to the valve housing and is thus configured to be a spool type. An oil passage is disposed above a center axis of the spool valve body, the oil passage being formed in the supporting holder and connecting the housing chamber and a damper chamber formed on an opposite side to the actuator, between the valve housing and the spool valve body.

According to the third aspect of the present invention, the oil pressure control valve is configured to be of a spool type and the oil passage is formed in the supporting holder to be disposed above the center axis of the spool valve body, the oil passage causing the damper chamber formed on the opposite side to the actuator, between the valve housing and the spool valve body, to communicate with the housing chamber. Accordingly, air from the damper chamber is more likely to be discharged to the outside from the oil return hole via the housing chamber.

A fourth aspect of the present invention is such that, in addition to the second or third aspect, an eaves portion covering the oil return hole from above protrudes integrally from the supporting holder.

According to the fourth aspect of the present invention, the oil return hole is covered from above with the eaves portion protruding integrally from the supporting holder. This prevents the oil falling from above the supporting holder from entering the oil return hole and thereby causing the discharge property of the hydraulic oil from the oil return hole to deteriorate.

A fifth aspect of the present invention is such that, in addition to the fourth aspect, paired ribs, which extend vertically with the oil return hole interposed therebetween in a front-rear direction, protrude integrally from the supporting holder with upper ends of the ribs being integrally continuous with the eaves portion.

According to the fifth aspect of the present invention, the paired ribs disposed in front and rear of the oil return hole with the oil return hole interposed therebetween extend vertically and protrude integrally from the supporting holder with the upper ends of the ribs being integrally continuous with the eaves portion. Accordingly, the supporting holder can be reinforced in a portion where the oil return hole is disposed. In addition, the hydraulic oil from the oil return hole can be led downward and discharged in an excellent manner.

A sixth aspect of the present invention is such that, in addition to the fifth aspect, paired oil pressure control valves individually corresponding to paired hydraulic clutches inserted in the power transmission system are arranged parallel to each other in the supporting holder, and at least one of the paired ribs protrudes integrally from the supporting holder to extend over both of the oil pressure control valves.

According to the sixth aspect of the present invention, at least one of the paired ribs protrudes integrally from the supporting holder to extend over the paired oil pressure control valves disposed parallel to each other in the supporting holder. Accordingly, the supporting holder can be reinforced in a portion where the paired oil pressure control valves are disposed.

A seventh aspect of the present invention is such that, in addition to any of the first to sixth aspects, the actuator, having a coupler that protrudes laterally and to which an electric wire is connected is connected to the oil pressure control valve such that the coupler is disposed on an oblique lower side or an oblique upper side of the actuator in a view in an operation axis direction of the oil pressure control valve.

According to the seventh aspect of the present invention, the actuator is connected to the oil pressure control valve such that the coupler is disposed on an oblique lower side or an oblique upper side of the actuator in the view in an operation axis direction of the oil pressure control valve. Accordingly, it is possible to prevent the coupler from largely protruding from the actuator in the up-down direction and in the right-left direction and to effectively use a dead space in the housing chamber to dispose the coupler.

An eighth aspect of the present invention is such that, in addition to the seventh aspect, paired actuators individually connected to paired oil pressure control valves, which are disposed parallel to each other in the supporting holder and which individually correspond to paired hydraulic clutches inserted in the power transmission system are connected respectively to the oil pressure control valves with the couplers of the actuators arranged in the same direction.

According to the eighth aspect of the present invention, the couplers of the paired actuators are arranged in the same direction. Accordingly, the paired actuators are housed in the housing chamber in a space efficient manner while interference between the couplers is avoided.

A ninth aspect of the present invention is such that, in addition to the second aspect, a recessed portion forming an electric wire lead-out hole between the supporting holder and the recessed portion is provided in the cover member, the electric wire lead-out hole being used to lead the electric wire connected to the actuator to the outside.

According to the ninth aspect of the present invention, the electric wire lead-out hole used to lead the electric wire connected to the actuator to the outside is formed between the supporting holder and the recessed portion provided in the cover member. Accordingly, deterioration in stiffness of the supporting holder can be suppressed compared to the case where the electric wire lead-out hole is provided in the supporting holder, in addition to the oil return hole.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

An embodiment of the present invention is described with reference to FIGS. 1 to 15. Note that front, rear, up, down, right, and left in the description below refer to directions viewed by a rider riding on a motorcycle.

Figure 1:
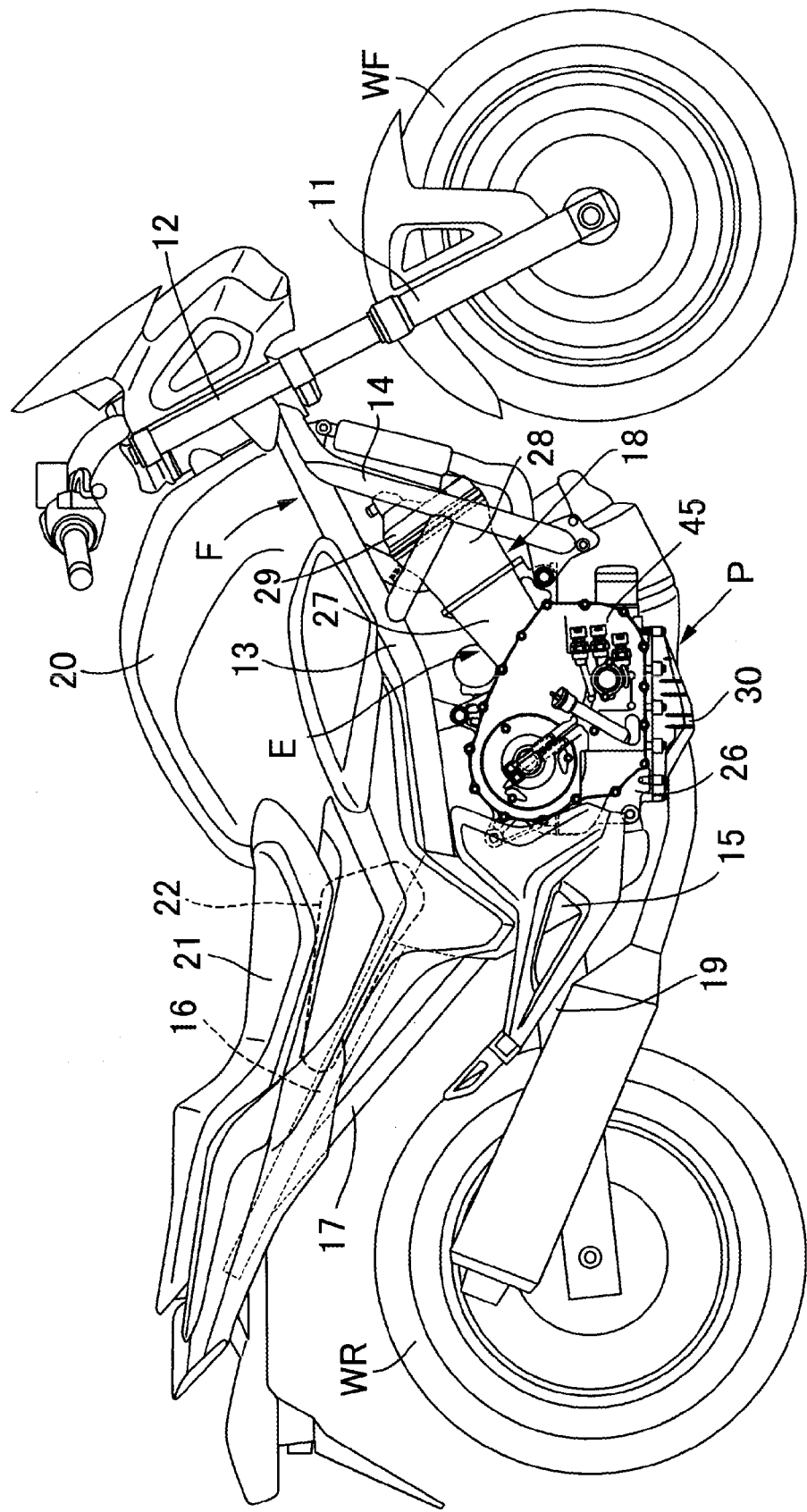
FIG. 1 is a right-side view of a motorcycle.

First, as shown in FIG. 1, a vehicle-body frame F of the motorcycle includes: a head pipe 12 steerably supporting a front fork 11 supporting a front wheel WF about an axis; right and left main frames 13 extending downward toward the rear from the head pipe 12; right and left down frames 14 extending downward toward the rear at an angle steeper than that of the main frames 13; right and left center frames 15 extending downward respectively from rear ends of the main frames 13; right and left seat rails 16 extending upward toward the rear respectively from upper portions of the center frames 15; and rear frames 17 connecting intermediate portions of the center frames 15 and rear portions of the seat rails 16 with each other.

A power unit P is disposed in a region surrounded by the main frames 13, the down frames 14, and the center frames 15 to be supported by the vehicle-body frame F. The power unit P includes an internal combustion engine E that has multiple cylinders, for example two cylinders, and a transmission M (see FIG. 3), which is partially built into an engine main body 18 of the internal combustion engine E. A front end portion of a swing arm 19 is supported by the center frames 15 so as to be swingable upward and downward. A rear wheel WR is supported about an axis at a rear end portion of the swing arm 19. The rear wheel WR is driven by a power generated by the power unit P. A storage box 20 is mounted on the main frames 13, above the internal combustion engine E. A rider seat 21 of a tandem type is disposed behind the storage box 20 to be supported by the seat rails 16. A fuel tank 22 is disposed under the rider seat 21.

Figure 2:
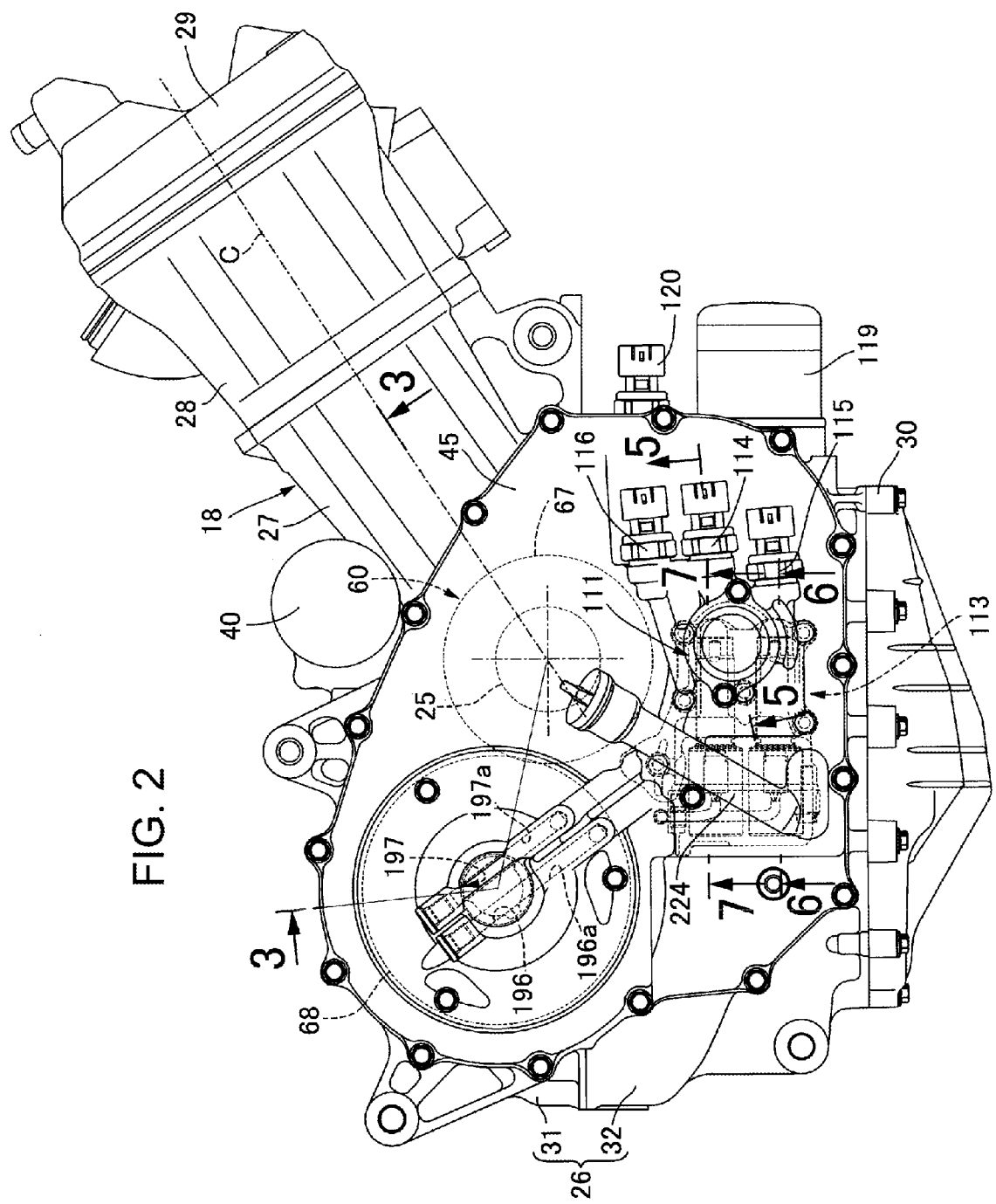
FIG. 2 is an enlarged side view showing a main portion of an internal combustion engine which is viewed in the same direction as that of FIG. 1.

As shown in FIG. 2, the engine main body 18 of the internal combustion engine E is mounted on the vehicle-body frame F and includes: a crankcase 26 rotatably supporting a crankshaft 25 having an axial line extending in a vehicle width direction; a cylinder block 27 joined to an upper end of a front portion of the crankcase 26 and having a cylinder axial line C inclining frontward; a cylinder head 28 joined to an upper end of the cylinder block 27; a head cover 29 joined to an upper end of the cylinder head 28; and a oil pan 30 joined to a lower portion of the crankcase 26.

Figure 3:
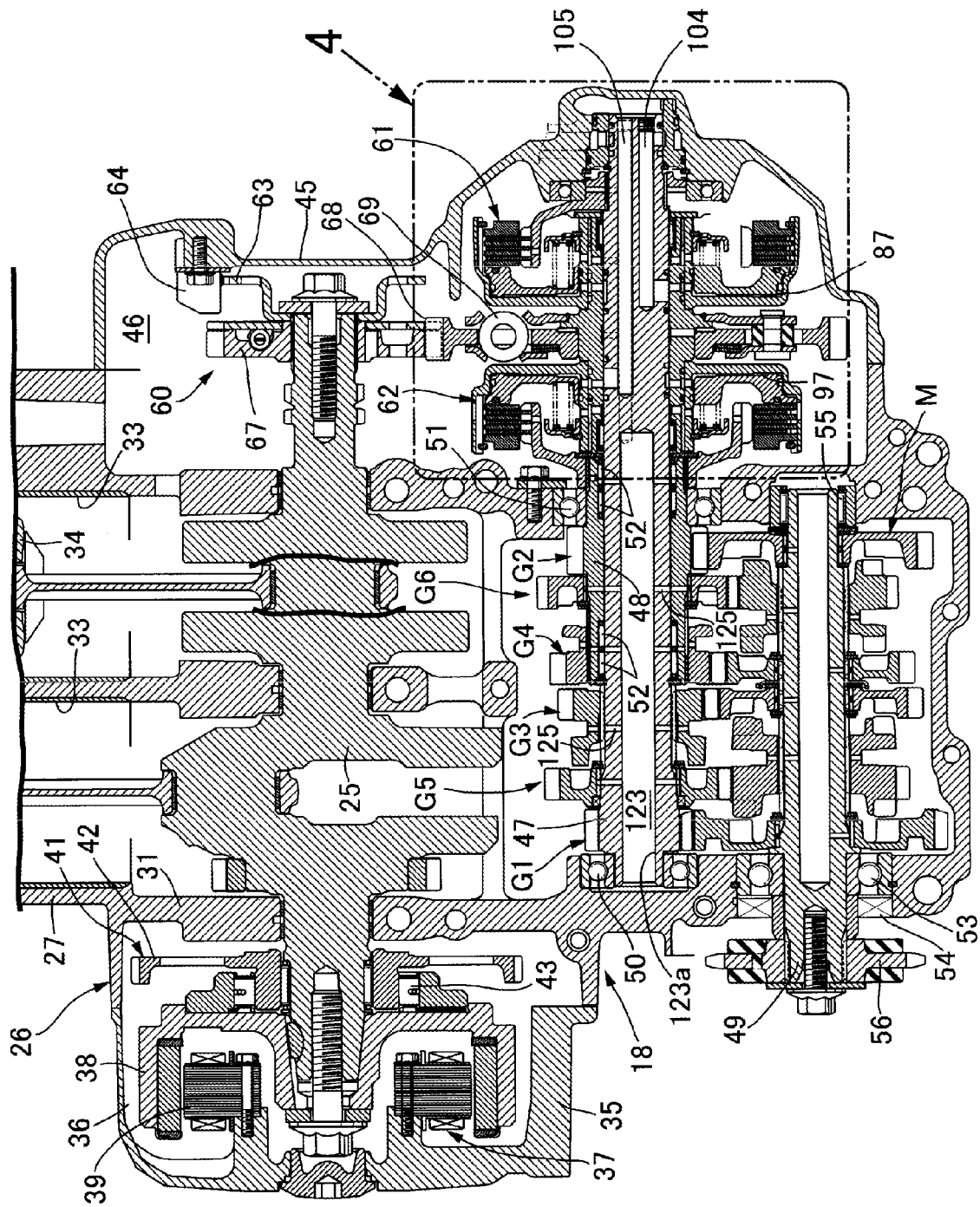
FIG. 3 is a cross-sectional view taken along the line 3-3 of FIG. 2.

Referring also to FIG. 3, the crankcase 26 is formed by joining an upper case half body 31 and a lower case half body 32 that can be divided from each other into upper and lower portions at a dividing surface extending along a horizontal plane passing through the axial line of the crankshaft 25. The cylinder block 27 is formed integrally with the upper case half body 31.

The cylinder block 27 has multiple, for example two, cylinder bores 33, 33 serially arranged in the vehicle width direction. Pistons 34 are slidably fitted to the cylinder bores 33, respectively. The pistons 34 are connected to the crankshaft 25, which is rotatably supported by the crankcase 26 and which extends in the vehicle width direction, i.e. the arrangement direction of the cylinder bores 33.

An electricity generator cover 35 forming an electricity generator chamber 36 between the electricity generator cover 35 and the crankcase 26 is joined to a left face of the crankcase 26. A rotor 38 of an electricity generator 37 housed in the electricity generator chamber 36 is fixed to an end portion of the crankshaft 25 protruding into the electricity generator chamber 36. A stator 39 of the electricity generator 37 is fixed to the electricity generator cover 35 to be surrounded by the rotor 38.

As shown in FIG. 2, a starter motor 40 is fixedly disposed in an upper portion of the crankcase 26. A driven gear 42 forming part of a reduction gear train 41 transmitting power from the starter motor 40 is connected to the rotor 38 via a one-way clutch 43.

A clutch cover 45 forming part of the engine main body 18 is joined to a right face of the crankcase 26 to form a clutch chamber 46 between the clutch cover 45 and the crankcase 26. The transmission M, which is housed in the crankcase 26, includes gear trains, for example a first speed gear train G1 to a sixth speed gear train G6, capable of selectively establishing multiple speeds between a counter shaft 49 and each of first and second main shafts 47, 48 which have axes parallel to the crankshaft 25 and which are rotatably supported by the crankcase 26.

The first and second main shafts 47, 48 are coaxially disposed. The first main shaft 47 rotatably penetrates a right wall of the crankcase 26 and is rotatably supported by the clutch cover 45. The other end of the first main shaft 47 is rotatably supported by a left wall of the crankcase 26 via a ball bearing 50. The second main shaft 48 coaxially surrounds the first main shaft 47 and rotatably penetrates the right wall of the crankcase 26. A ball bearing 51 is interposed between the right wall of the crankcase 26 and the second main shaft 48 and multiple needle bearings 52, 52 are interposed between the first and second main shafts 47, 48.

One end portion of the counter shaft 49 protrudes from a rear portion of the left wall of the crankcase 26 with a ball bearing 53 and an annular sealing member 54 interposed between the counter shaft 49 and the left wall of the crankcase 26. The other end portion of the counter shaft 49 is rotatably supported by the right wall of the crankcase 26 with a needle bearing 55 interposed therebetween.

The first speed gear train G1, the third speed gear train G3, and the fifth speed gear train G5 are provided between the first main shaft 47 and the counter shaft 49. The second speed gear train G2, the fourth speed gear train G4, and the sixth speed gear train G6 are provided between the second main shaft 48 and the counter shaft 49.

A driving sprocket 56 is fixed to the one end portion of the counter shaft 49 protruding from the left wall of the crankcase 26 and a rotational power outputted from the transmission M is transmitted to the rear wheel WR by use of an endless chain (not shown) wound around the driving sprocket 56.

A power transmission system, which transmits the rotational power outputted from the crankshaft 25 of the internal combustion engine E to the rear wheel WR, is configured to include a primary reduction device 60 transmitting the power from the crankshaft 25, a first hydraulic clutch 61, a second hydraulic clutch 62, the transmission M, the driving sprocket 56, and the chain. The primary reduction device 60, the first hydraulic clutch 61 interposed between the primary reduction device 60 and the first main shaft 47, and the second hydraulic clutch 62 interposed between the primary reduction device 60 and the second main shaft 48 are housed in the clutch chamber 46.

A pulsar 63 is fixedly attached to an end portion of the crankshaft 25 in the clutch chamber 46. A rotational speed sensor 64 disposed in the clutch chamber 46 to face an outer periphery of the pulsar 63 is fixed to the clutch cover 45.

Figure 4:
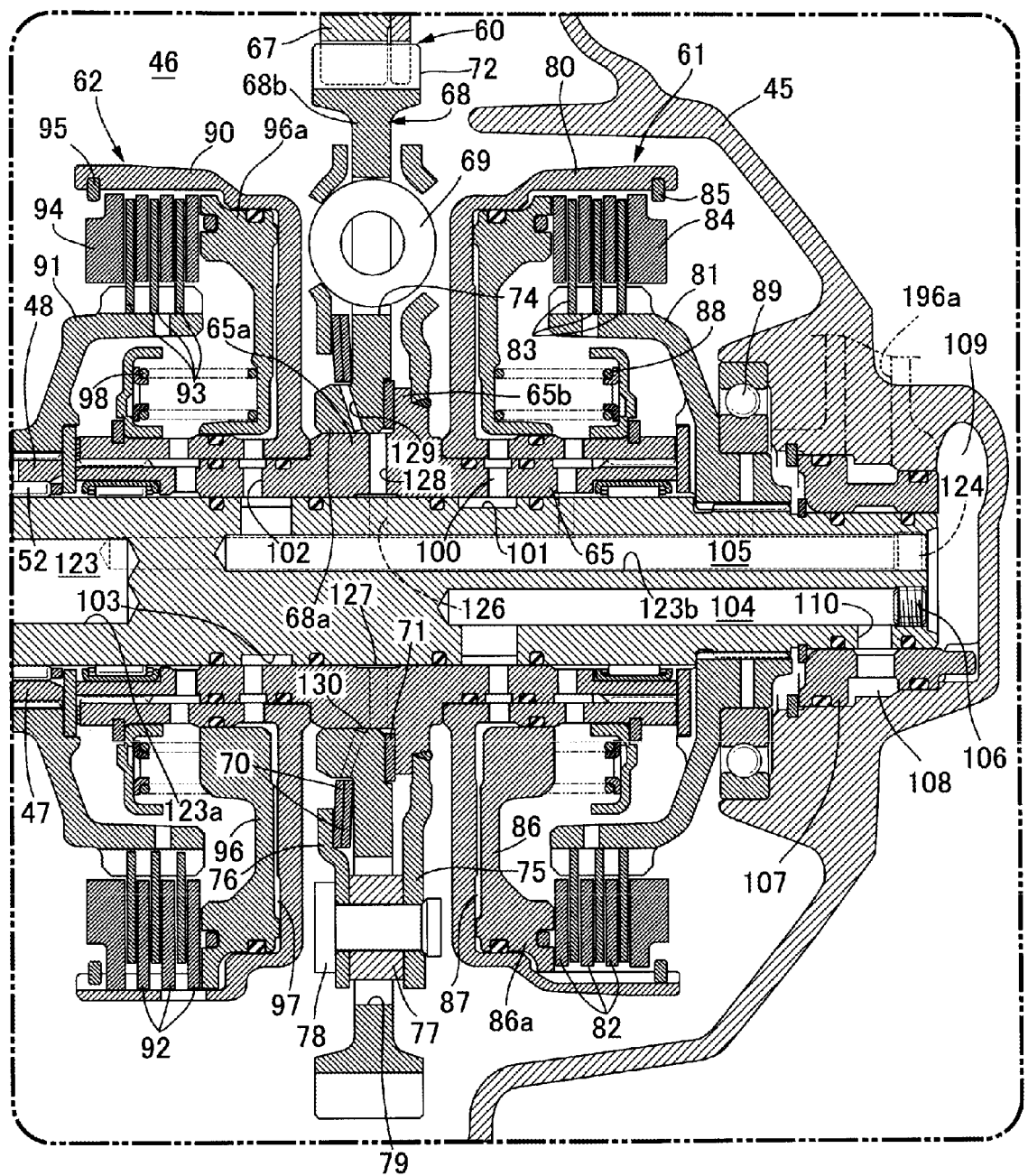
FIG. 4 is an enlarged view of a portion shown by the arrow 4 of FIG. 3.

In FIG. 4, a hollow power transmission tube shaft 65 is fitted to an intermediate portion of the first main shaft 47, which is located closer to the other end of the first main shaft 47, to be adjacent to the second main shaft 48 in an axial direction and to be capable of rotating relative to the first main shaft 47. A large-diameter portion 65a and a flange portion 65b are integrally provided in the power transmission tube shaft 65, the large-diameter portion 65a bulging to protrude outward in a radial direction in an intermediate portion of the power transmission tube shaft 65 in the axial direction, the flange portion 65b protruding outward in the radial direction from an outer periphery of the large-diameter portion 65a. The first hydraulic clutch 61 is provided on the power transmission tube shaft 65 and the first main shaft 47 to be capable of performing switching of disconnection and connection of power between the power transmission tube shaft 65 and the first main shaft 47. The second hydraulic clutch 62 is provided on the power transmission tube shaft 65 and the second main shaft 48 to be capable of performing switching of disconnection and connection of power between the power transmission tube shaft 65 and the second main shaft 48.

The primary reduction device 60 includes: a primary driving gear 67 which, rotates together with the crankshaft 25; a primary driven gear 68, which is supported to be capable of moving in the axial direction and rotating relative to the large-diameter portion 65a of the power transmission tube shaft 65 such that the primary driven gear 68 rotates when the rotational power is transmitted thereto from the crankshaft 25 via the primary driving gear 67; multiple damper springs 69, which are interposed between the power transmission tube shaft 65 and the primary driven gear 68; friction springs 70, which bias the primary driven gear 68 toward the flange portion 65b to generate a friction force between the primary driven gear 68 and the flange portion 65b of the power transmission tube shaft 65 and thereby suppress relative rotation between the power transmission tube shaft 65 and the primary driven gear 68.

The primary driven gear 68 integrally has: a cylindrical boss portion 68a, which coaxially surrounds the large-diameter portion 65a of the power transmission tube shaft 65; and a circular plate portion 68b, which protrudes outward from the boss portion 68a in the radial direction and in which multiple teeth 72, 72 meshing with the primary driving gear 67 are provided in an outer periphery. The circular plate portion 68b is provided continuously and integrally with an end portion of the boss portion 68a on a side close to the flange portion 65b. An annular washer 71 is interposed between the flange portion 65b and an inner peripheral portion of the primary driven gear 68 on the side close to the flange portion 65b.

The damper springs 69 are coil springs and are housed in multiple housing holes 74 provided in the circular plate portion 68b of the primary driven gear 68 at equal intervals in a circumferential direction. The circular plate portion 68b is interposed between a first side plate 75 facing a side surface of the circular plate portion 68b on a side close to the flange portion 65b and a second side plate 76 facing a side surface of the circular plate portion 68b on the opposite side to the flange portion 65b, and the damper springs 69 are held in the housing holes 74 by the side plates 75, 76. Moreover, cylindrical collars 77 are interposed between the first and second side plates 75, 76 and are disposed respectively at multiple positions, at equal intervals in a circumferential direction of the first and second side plates 75, 76. The first and second side plates 75, 76 are connected to each other by rivets 78 that extend through the collars 77. The first and second side plates 75, 76 are thus fixed to the power transmission tube shaft 65 and rotate together with the power transmission tube shaft 65.

When the primary driven gear 68 is not rotating relative to the first side plate 75, the second side plate 76, and the power transmission tube shaft 65, both ends of each of the damper springs 69 are in contact with the primary driven gear 68 and with the first and second side plates 75, 76. When the primary driven gear 68 rotates relative to the first side plate 75 and the second side plate 76, the damper springs 69 are compressed between the first driving gear 68 and the first and second side plates 75, 76, and an abrupt change in torque, which is caused by a spring force exerted by the damper springs 69 is buffered.

Moreover, multiple restriction holes 79 in which the collars 77 are respectively inserted are provided in the circular plate portion 68b of the primary driven gear 68 and are each formed to have a long hole shape elongated in a circumferential direction of the power transmission tube shaft 65. Hence, the rotation of the primary driven gear 68 relative to the first and second side plates 75, 76, i.e. the power transmission tube shaft 65 is restricted within a range in which the collars 77 move in the restriction holes 79.

The friction springs 70 are disc springs inclining to be farther away from the flange portion 65b toward an outer side in the radial direction. Two friction springs 70, 70 overlapping each other are interposed between the second side plate 76 and the circular plate portion 68b such that smaller diameter ends of the friction springs 70, 70 on the inner peripheral sides are brought into contact with the side surface of the circular plate portion 68b of the primary driven gear 68 on the opposite side to the flange portion 65b.

The first hydraulic clutch 61 is disposed to the right of the primary reduction device 60 and includes: a first clutch outer 80, a first clutch inner 81, multiple first driving friction plates 82, 82, multiple first driven friction plates 83, 83, a ring-shaped first pressure receiving plate 84, a first retaining ring 85, a first piston 86, and a first clutch spring 88. The first clutch outer 80 is formed in a bowl shape opened to the opposite side to the primary reduction device 60 and is joined to the power transmission tube shaft 65 to be incapable of rotating relative thereto. The first clutch inner 81 is joined to the first main shaft 47 to be incapable of rotating relative thereto. The first driving friction plates 82, 82 are engaged with the first clutch outer 80 to be capable of performing a relative movement in the axial direction. The first driven friction plates 83, 83 are disposed alternately with the first driving friction plates 82, 82 and are engaged with the clutch inner 81 to be capable of performing a relative movement in the axial direction. The first pressure receiving plate 84 faces the outermost one of the multiple first driving friction plates 82, 82 and the multiple first driven friction plates 83, 83, which are disposed alternately. The first retaining ring 85 is attached to the first clutch outer 80 to be capable of engaging with the first pressure receiving plate 84 from the opposite side to the first driving friction plates 82, 82 and the first driven friction plates 83, 83. The first piston 86 has a pushing portion 86a in an outer circumferential portion and the first driving friction plates 82, 82 and the first driven friction plates 83, 83 are interposed between the pushing portion 86a and the first pressure receiving plate 84. Moreover, the first piston 86 is slidably fitted to the first clutch outer 80 in a liquid tight manner and forms a first oil pressure chamber 87 between the first piston 86 and the first clutch outer 80. The first clutch spring 88 biases the first piston 86 in such a direction that the capacity of the first oil pressure chamber 87 becomes smaller. A ball bearing 89 is interposed between the first clutch inner 81 and the clutch cover 45. In other words, the other end portion of the first main shaft 47 is rotatably supported by the clutch cover 45 via the first clutch inner 81.

When the hydraulic pressure is not acting on the first oil pressure chamber 87, the first hydraulic clutch 61 as described above is in a clutch off state where the power transmission is cut off. When the oil pressure is acting on the first oil pressure chamber 87, the first hydraulic clutch 61 is in a clutch on state where the rotational power transmitted from the crankshaft 25 to the first clutch outer 80 via the primary reduction device 60, the damper springs 69, and the power transmission tube shaft 65 is transmitted to the first main shaft 47.

The second hydraulic clutch 62 disposed closer to the crankcase 26 than the first hydraulic clutch 61 with the primary reduction device 60 interposed between the second hydraulic clutch 62 and the first hydraulic clutch 61. The second hydraulic clutch 62 includes a second clutch outer 90, a second clutch inner 91, multiple driving friction plates 92, 92, multiple second driven friction plates 93, 93, a ring-shaped second pressure receiving plate 94, a second retaining ring 95, a second piston 96, and a second clutch spring 98. The second clutch outer 90 is formed in a tubular shape opened toward the crankcase 26 and is joined to the power transmission tube shaft 65 to be incapable of rotating relative thereto with the primary driven gear 68 interposed between the second clutch outer 90 and the first clutch outer 80. The second clutch inner 91 is joined to the second main shaft 48 to be incapable of rotating relative thereto. The second driving friction plates 92, 92 are engaged with the second clutch outer 90 to be capable of performing a relative movement in the axial direction. The second driven friction plates 93, 93 are disposed alternately with the second driving friction plates 92, 92 and are engaged with the second clutch inner 91 to be capable of performing a relative movement in an axial direction. The second pressure receiving plate 94 faces the outermost one of the multiple second driving friction plates 92, 92 and the multiple second driven friction plates 93, 93, which are disposed alternately. The second retaining ring 95 is attached to the second clutch outer 90 to be capable of engaging with the second pressure receiving plate 94 from the opposite side to the second driving friction plates 92, 92 and the second driven friction plates 93, 93. The second piston 96 has a pushing portion 96a in an outer circumferential portion and the second driving friction plates 92, 92 and the second driven friction plates 93, 93 are interposed between the pushing portion 96a and the second pressure receiving plate 94. Moreover, the second piston 96 is slidably fitted to the second clutch outer 90 in a liquid tight manner and forms a second oil pressure chamber 97 between the second piston 96 and the second clutch outer 90. The second clutch spring 98 biases the second piston 96 in such a direction that the capacity of the second oil pressure chamber 97 becomes smaller.

When the hydraulic pressure is not acting on the second oil pressure chamber 97, the second hydraulic clutch 62, as described above, is in a clutch off state where the power transmission is cut off. When the oil pressure is acting on the second oil pressure chamber 97, the second hydraulic clutch 62 is in a clutch on state where the rotational power transmitted from the crankshaft 25 to the second clutch outer 90 via the primary reduction device 60, the damper springs 69, and the power transmission tube shaft 65 is transmitted to the second main shaft 48.

A first oil passage 100 communicating with the first oil pressure chamber 87 is provided in the first clutch outer 80 of the first hydraulic clutch 61 and the power transmission tube shaft 65. A first annular recessed portion 101 communicating with the first oil passage 100 is provided in an outer periphery of the first main shaft 47. Moreover, a second oil passage 102 communicating with the second oil pressure chamber 97 is provided in the second clutch outer 90 of the second hydraulic clutch 62 and the power transmission tube shaft 65. A second annular recessed portion 103 communicating with the second oil passage 102 is provided in an outer periphery of the first main shaft 47.

First and second axial direction oil passages 104, 105 parallel to each other are provided in an end portion of the first main shaft 47 on a side close to the clutch cover 45 to have inner ends thereof closed and extend in the axial direction. The first axial direction oil passage 104 communicates with the first oil pressure chamber 87 via the first annular recessed portion 101 and the first oil passage 100. The second axial direction oil passage 105 communicates with the second oil pressure chamber 97 via the second annular recessed portion 103 and the second oil passage 102. Moreover, an outer end opening portion of the first axial direction oil passage 104 is closed with a plug member 106 and an outer end of the second axial direction oil passage 105 is left open.

The end portion of the first main shaft 47 on the side close to the clutch cover 45 is fitted to a tube member 107 fitted and fixed to the clutch cover 45. A communication passage 110 causing the first axial direction oil passage 104 to communicate with an annular first oil chamber 108 formed between an outer periphery of the tube member 107 and the clutch cover 45 is provided in the first main shaft 47 and the tube member 107. Moreover, a second oil chamber 109 communicating with the second axial direction oil passage 105 is formed between the clutch cover 45 and a group of the first main shaft 47 and the tube member 107.

Referring to FIG. 2, a first oil filter 111 is provided in a lower portion of the clutch cover 45. A level gauge insertion tube 224 located behind the first oil filter 111 is provided in the clutch cover 45 to extend upward from the lower portion of the clutch cover 45. Moreover, oil for control is supplied to the first oil filter 111, after being discharged from a first oil pump (not illustrated) built in the engine main body 18 such that oil in the oil pan 30 is pumped up. An oil pressure control device 113 for controlling the pressure of the oil cleaned by the first oil filter 111 for each of the first hydraulic clutch 61 and the second hydraulic clutch 62 is disposed on an inner face side of the clutch cover 45 to partially overlap the level gauge insertion tube 224 in a side view. Furthermore, an oil filter oil pressure sensor 114, which detects the pressure of the oil to be supplied to the first oil filter 111, is attached to the first oil filter 111. First and second oil pressure sensors 115, 116 individually detecting the oil pressures of the first and second hydraulic clutches 61, 62 controlled by the oil pressure control device 113 are disposed in the clutch cover 45.

Moreover, a second oil pump (not illustrated) different from the first oil pump is built in the engine main body 18 to discharge a lubrication oil. The oil discharged from the second oil pump is cleaned by a second oil filter 119 attached to a lower portion of a front wall of the crankcase 26 in the engine main body 18. A lubrication oil pressure sensor 120, which detects a supplying oil pressure of the lubrication oil, is attached to a front face of the crankcase 26.

Referring to FIGS. 3 and 4, a lubrication oil passage 123 is provided in the first main shaft 47. The lubrication oil passage 123 allows the lubrication oil cleaned by the second oil filter 119 to be supplied to portions to be lubricated around the first main shaft 47.

The lubrication oil is supplied to the lubrication oil passage 123 from the end portion of the first main shaft 47 on the opposite side to the clutch cover 45. The lubrication oil passage 123 is formed of an upstream oil passage 123a provided coaxially with the first main shaft 47 and a downstream oil passage 123b formed to have a diameter smaller than the upstream oil passage 123a and extending parallel to the axis of the first main shaft 47. The downstream oil passage 123b is preferably formed to have the same diameter as those of the first and second axial direction oil passages 104, 105.

The upstream oil passage 123a is bored in the first main shaft 47 such that the first main shaft 47 is opened at an outer end in the end portion on the opposite side to the clutch cover 45. An inner end of the upstream oil passage 123a is arranged at a position overlapping, in the side view, the second hydraulic clutch 62 out of the first and second hydraulic clutches 61, 62 arranged side by side in the direction along the axis of the first main shaft 47. Meanwhile, the downstream oil passage 123b is bored in the first main shaft 47 from the end portion close to the clutch cover 45 to communicate with the inner end of the upstream oil passage 123a. An outer end of the downstream oil passage 123b is closed by a plug 124.

Oil holes 125, 125 for supplying the lubrication oil to multiple portions of the transmission M and a portion between the first and second main shafts 47, 48 are provided at multiple locations in the first main shaft 47 with intervals in the axial direction, in such a way that inner ends of the oil holes 125, 125 communicate with the upstream oil passage 123a of the lubrication oil passage 123.

Moreover, multiple communication passages 126, whose inner ends communicate with the downstream oil passage 123b of the lubrication oil passage 123, are provided in the first main shaft 47 such that outer ends of the communication passages 126 communicate with an annular groove 127 provided in an inner periphery of the power transmission tube shaft 65 at a position corresponding to an intermediate portion of the large diameter portion 65a of the power transmission tube shaft 65 in the axial direction. Multiple supply oil holes 128, which each have one end opened at the inner periphery of the power transmission tube shaft 65 to communicate with the annular groove 127, are provided in the large diameter portion 65a of the power transmission tube shaft 65 to extend in the radial direction of the power transmission tube shaft 65. The other ends of the supply oil holes 128 are opened at the outer periphery of the large diameter portion 65a of the power transmission tube shaft 65 while at least partially facing an inner peripheral surface of the boss portion 68a in the primary driven gear 68 on the side close to the flange portion 65b.

An annular groove 130 allowing the lubrication oil to be supplied from the supply oil holes 128 is provided in the inner periphery of the boss portion 68a. Multiple boss portion oil holes 129, whose one ends are opened at the inner periphery of the boss portion 68a to communicate with the annular groove 130, are provided in the boss portion 68a. The other ends of the boss portion oil holes 129 are each opened at the outer periphery of the boss portion 68a at such a position that the circular plate portion 68b of the primary driven gear 68 is disposed between the other end of the boss portion oil hole 129 and the flange portion 65b. Furthermore, the boss portion oil holes 129 are formed to incline to be away from the flange portion 65b toward the outer periphery of the boss portion 68a.

The opening portions of the boss portion oil holes 129 at the outer periphery of the boss portion 68a are disposed at positions corresponding to the friction springs 70 in contact with the side surface of the circular plate portion 68b of the primary driven gear 68 on the opposite side to the flange portion 65b. The friction springs 70 are disc springs inclining to be farther away from the flange portion 65b toward the outer side in the radial direction and the smaller diameter ends of the friction springs 70 on the inner peripheral sides are in contact with the side surface of the circular plate portion 68b on the opposite side to the flange portion 65b. Hence, the opening portions of the boss portion oil holes 129 at the outer periphery of the boss portion 68a are located at the positions corresponding to the contact portions of the smaller diameter ends of the friction springs 70 to the circular plate portion 68b.

Figure 5:
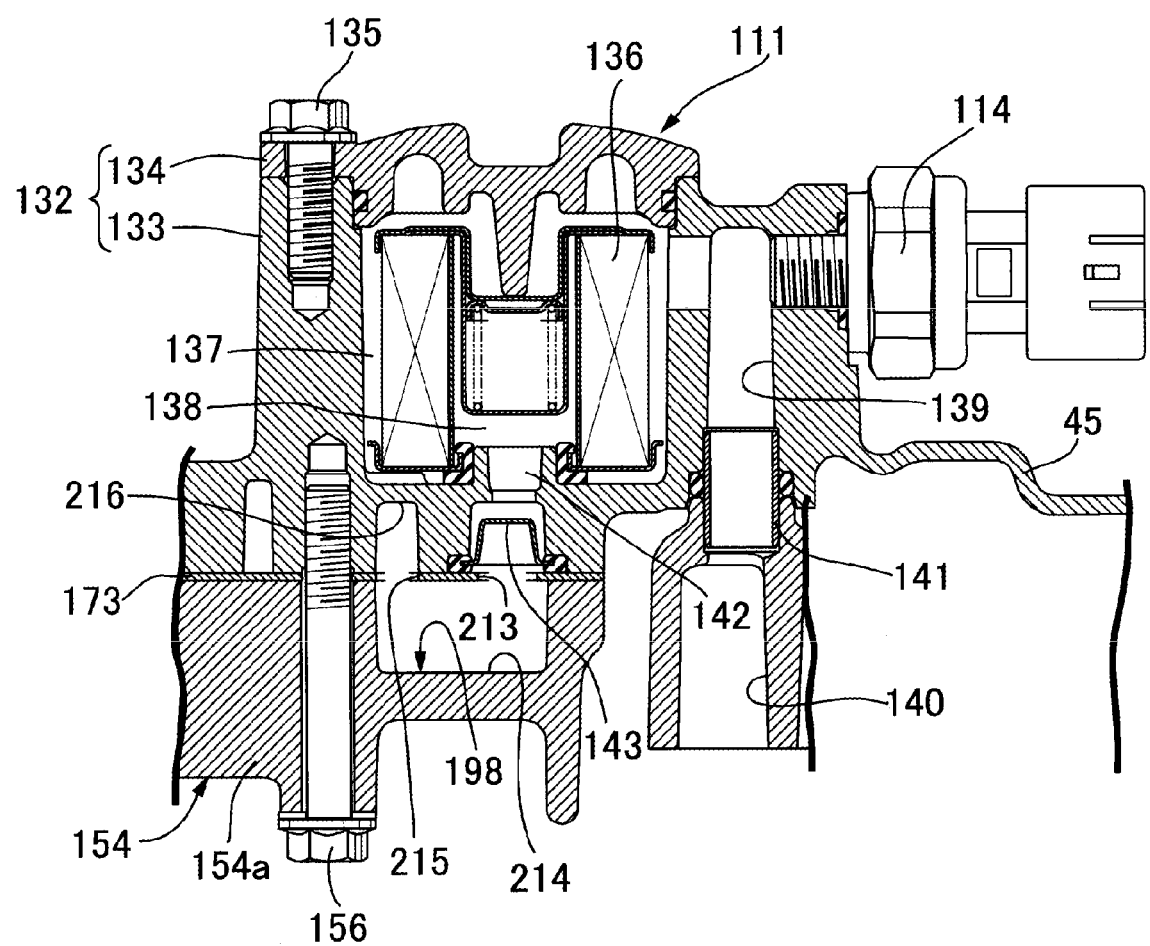
FIG. 5 is an enlarged cross-sectional view taken along the line 5-5 of FIG. 2.

In FIG. 5, a filter case 132 of the first oil filter 111 has a cylindrical shape and is formed of a bottomed cylindrical case main portion 133 formed integrally with the clutch cover 45 and a lid member 134 joined to the case main portion 133 with a pair of bolts 135. A filtering material 136 formed in a ring shape is inserted and held in the filter case 132. An uncleaned oil chamber 137 is formed between an outer periphery of the filtering material 136 and the filter case 132 while a cleaned oil chamber 138 is formed in the filtering material 136.

An inlet passage 139 communicating with the uncleaned oil chamber 137 is provided in a side wall of the case main portion 133. A connection passage 140 into which a hydraulic oil discharged from the first oil pump is introduced communicates with the inlet passage 139 via a connection pipe 141 and the hydraulic oil discharged from the first oil pump is supplied to the uncleaned oil chamber 137.

The oil filter oil pressure sensor 114 is attached to the case main portion 133 such that the axis of the oil filter oil pressure sensor 114 is perpendicular to the axis of the filter case 132 and such that a front end of the oil filter oil pressure sensor 114 faces the inlet passage 139. Moreover, an outlet passage 142 communicating with the cleaned oil chamber 138 is provided in the clutch cover 45 and a filter 143 is attached to the outlet passage 142.

Figure 6:
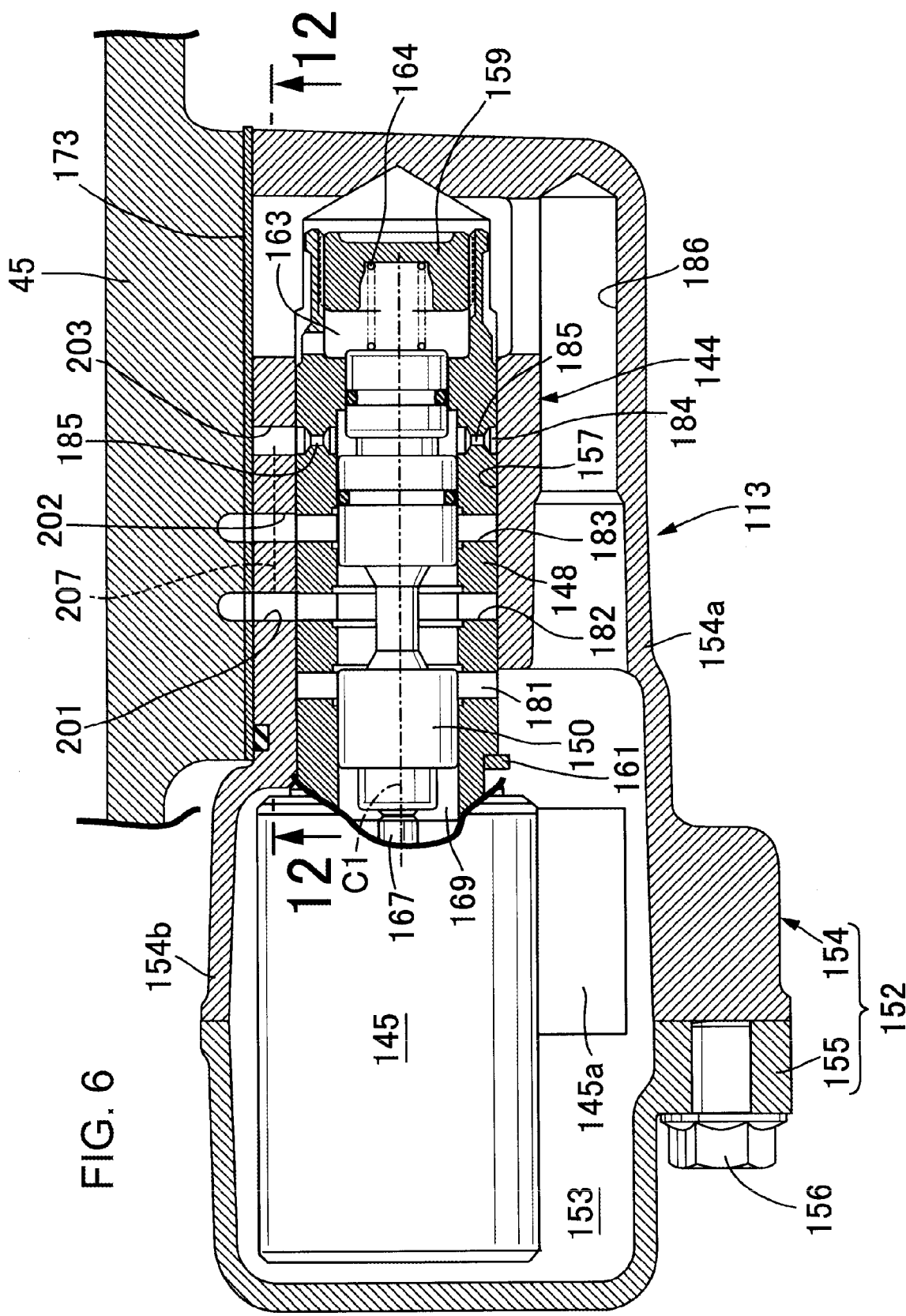
FIG. 6 is an enlarged cross-sectional view taken along the line 6-6 of FIG. 2.
Figure 7:
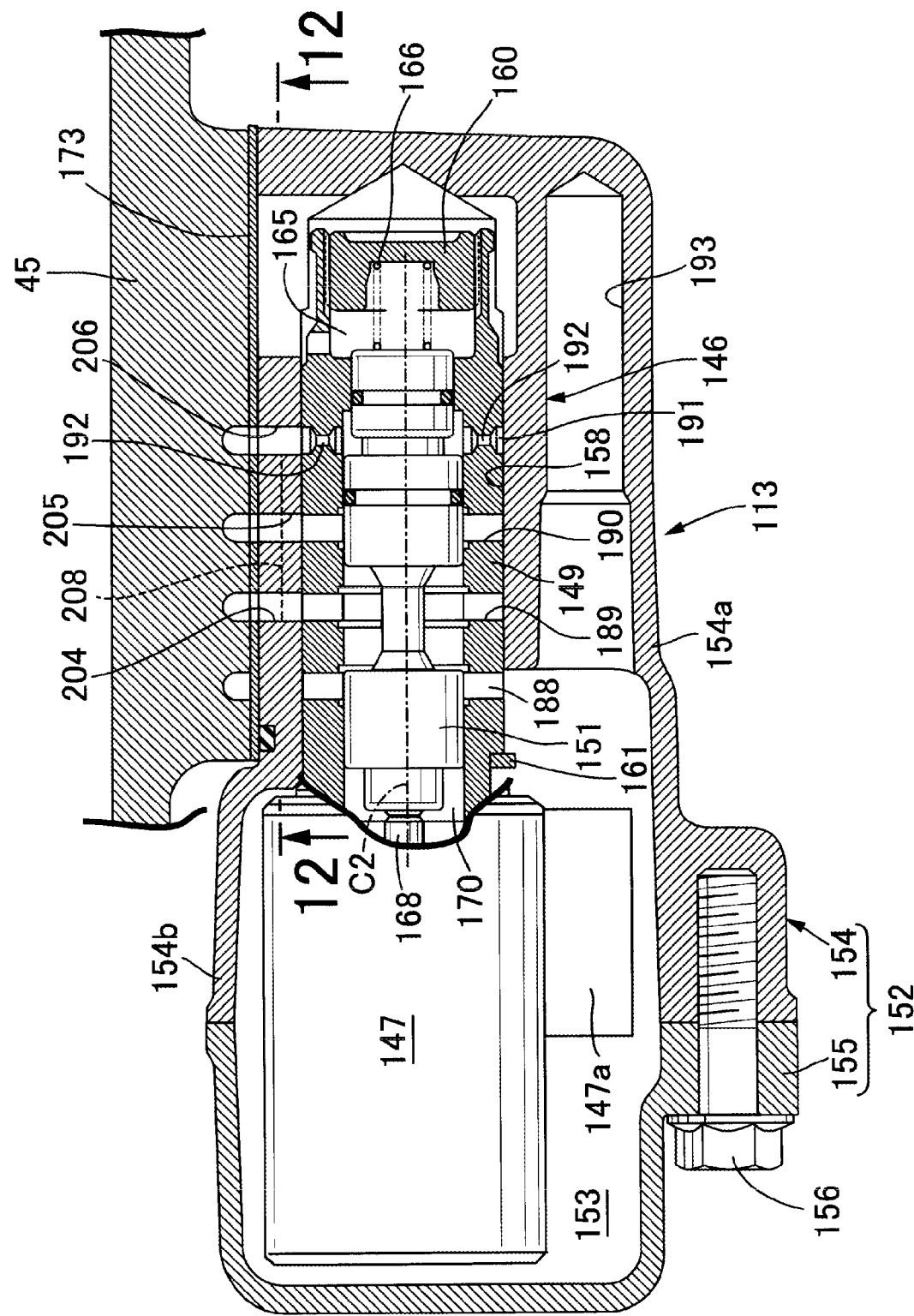
FIG. 7 is an enlarged cross-sectional view taken along the line 7-7 of FIG. 2.
Figure 8:
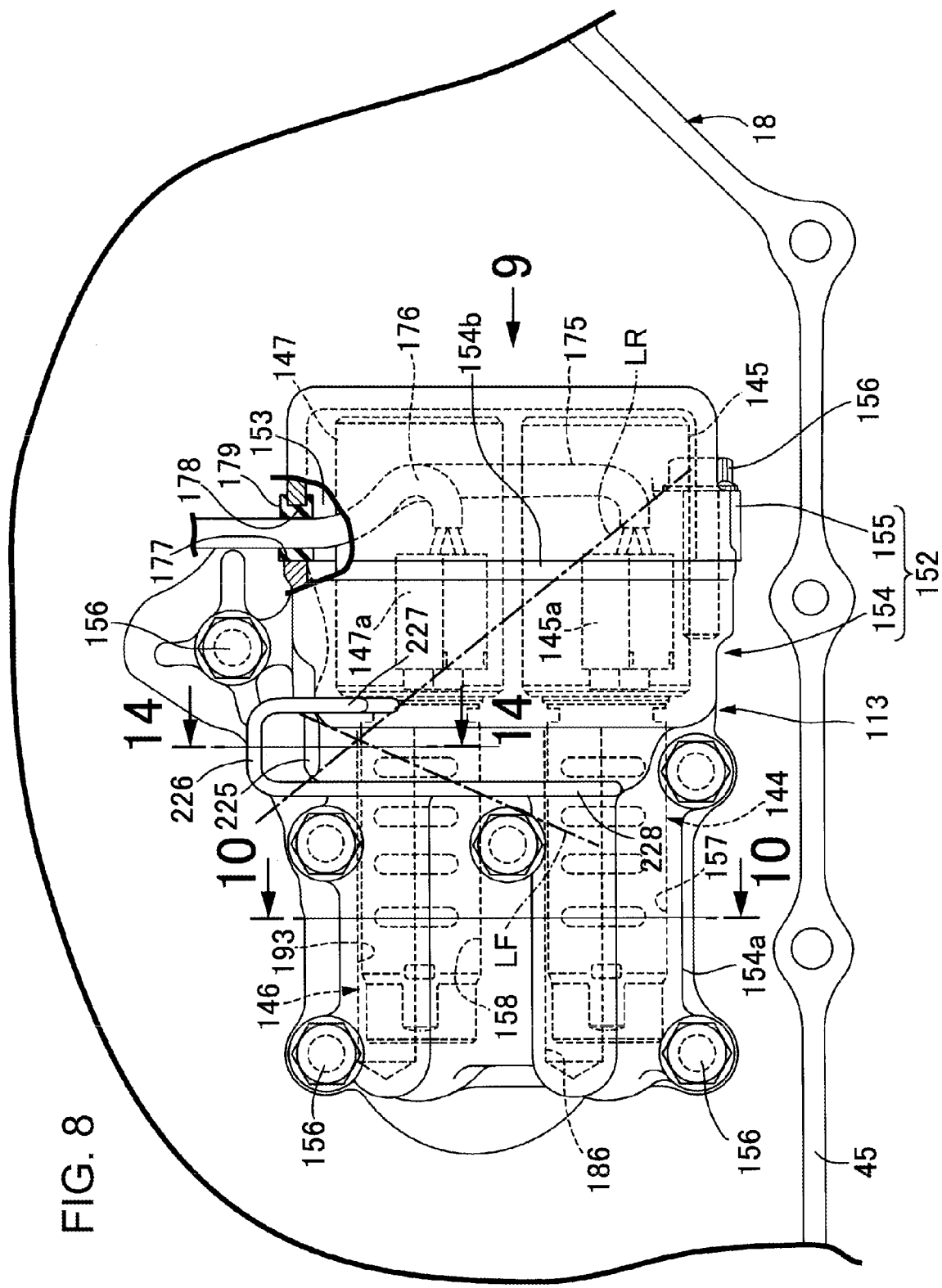
FIG. 8 is a partially cutaway side view of an oil pressure control device viewed from an inner face side of a clutch cover.

Referring also to FIGS. 6 to 8, the oil pressure control device 113 is formed of: a first oil pressure control valve 144 that controls the oil pressure of the first hydraulic clutch 61; a first solenoid 145 that is an actuator connected to the first oil pressure control valve 144 to drive the first oil pressure control valve 144; a second oil pressure control valve 146 that controls the oil pressure of the second hydraulic clutch 62; a second solenoid 147 that is an actuator connected to the second oil pressure control valve 146 to drive the second oil pressure control valve 146. The oil pressure control device 113 is disposed on the inner face side of the clutch cover 45.

The first and second oil pressure control valves 144, 146 include valve housings 148, 149 and spool valve bodies 150, 151 housed in the valve housings 148, 149 and are thus configured to be of a spool-type. The first and second oil pressure control valves 144, 146 are disposed on the inner face side of the clutch cover 45 forming part of the engine main body 18 in such a posture that the operating directions thereof extend in a front-rear direction of the vehicle-body frame F.

A housing chamber forming body 152 is attached the inner face of the clutch cover 45 and a housing chamber 153, which houses the first and second solenoids 145, 147, is formed in the housing chamber forming body 152. The first and second oil pressure control valves 144, 146 are supported by the housing chamber forming body 152 to partially face the housing chamber 153.

Figure 9:
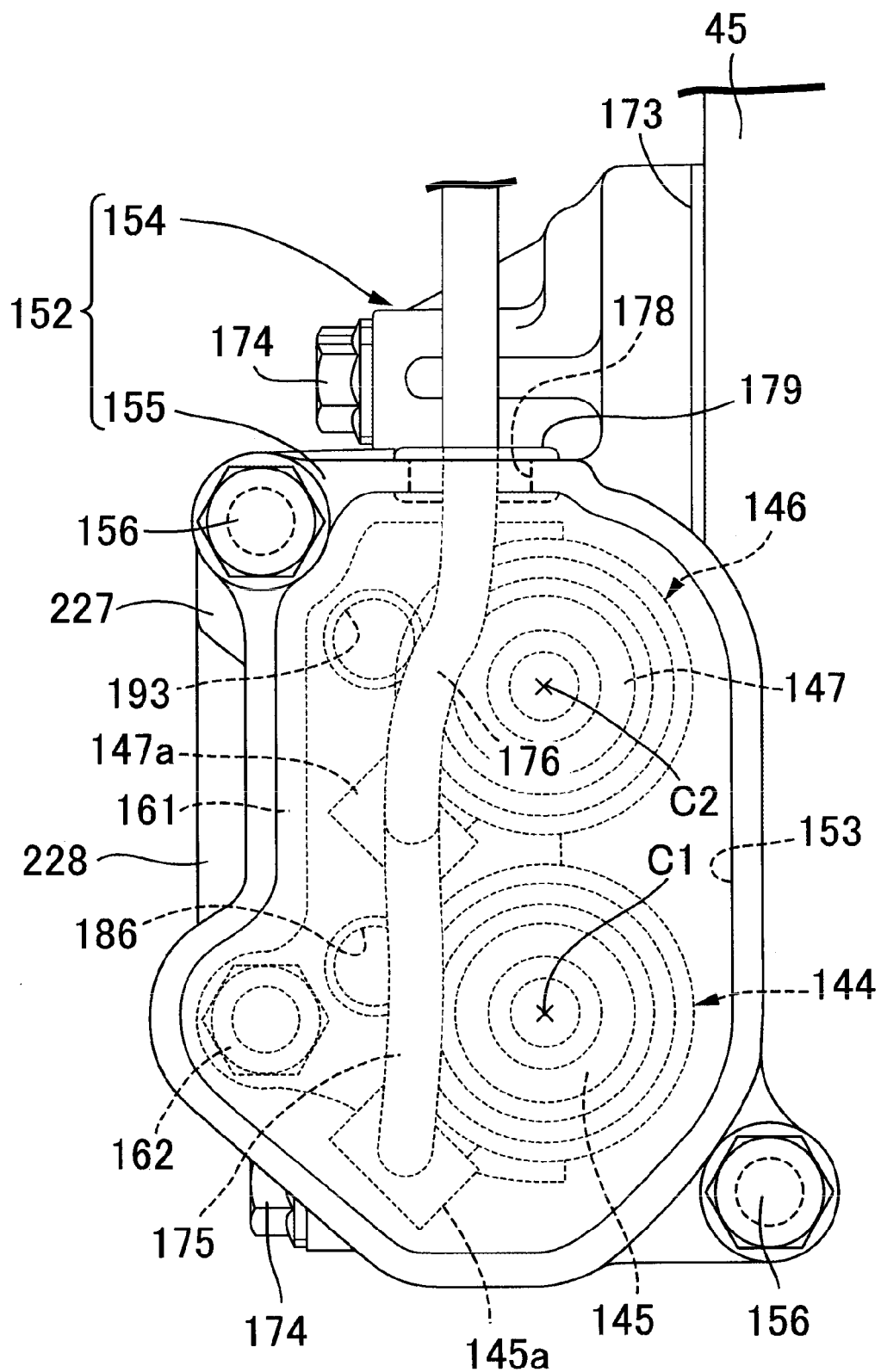
FIG. 9 is a view viewed in a direction of the arrow 9 of FIG. 8.

Referring also to FIG. 9, the housing chamber forming body 152 is formed of a supporting holder 154 and a cover member 155. The supporting holder 154 is attached to the clutch cover 45 with the first and second oil pressure control valves 144, 146 fitted to and supported by the supporting holder 154. The cover member 155 is attached to the supporting holder 154 to form the housing chamber 153 between the cover member 155 and the supporting holder 154.

The supporting holder 154 integrally has a holder main portion 154a and a tube portion 154b, which is formed to have a tubular shape opened rearward and extends rearward from a rear end of the holder main portion 154a. The cover member 155 is formed to have a bottomed tubular shape opened frontward and is joined to the rear end of the tube portion 154b with multiple, for example two bolts 156, 156 to close a rear-end opening portion of the tube portion 154b. The supporting holder 154 and the cover member 155 thus form the housing chamber 153.

Figure 10:
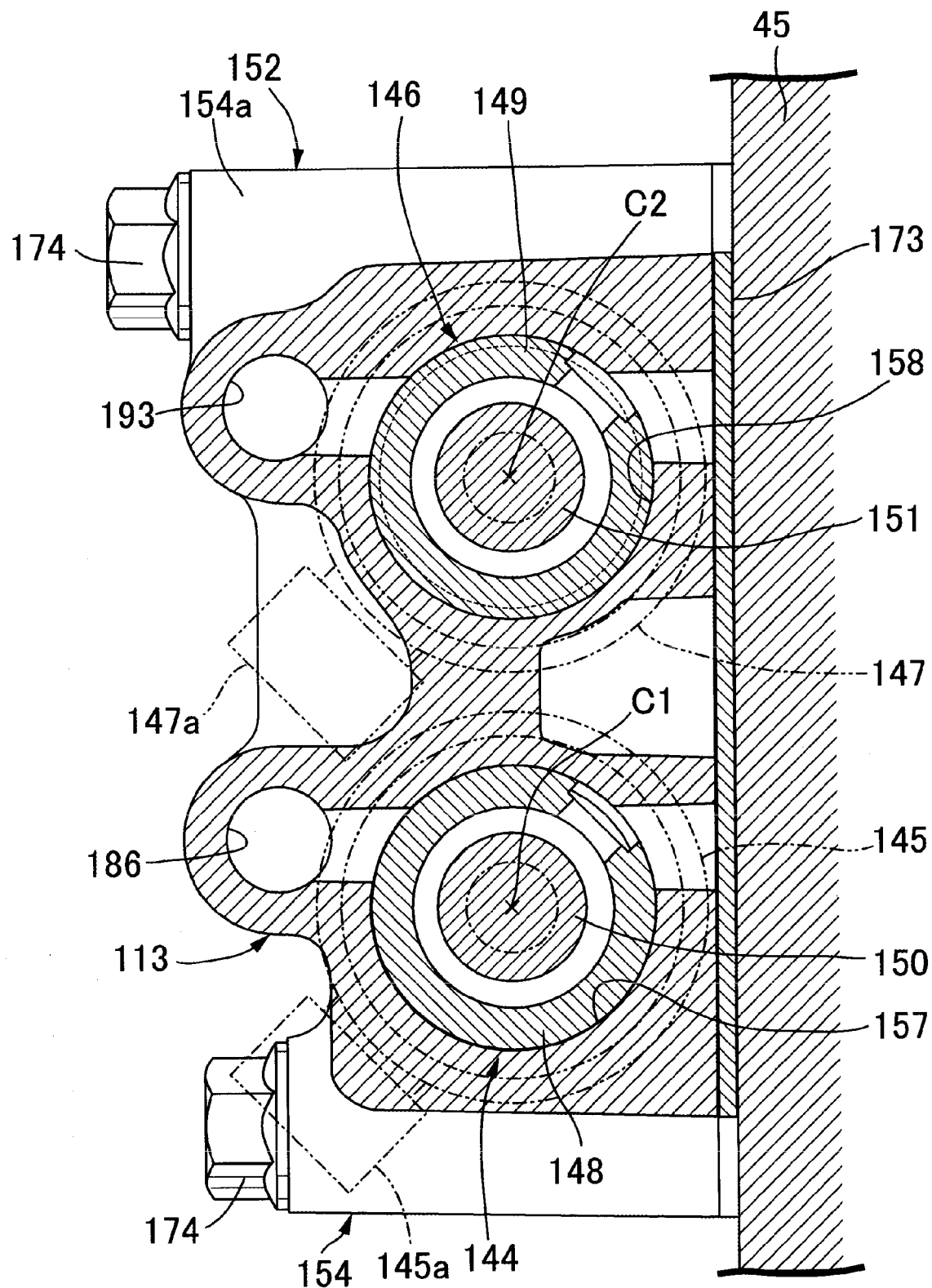
FIG. 10 is an enlarged cross-sectional view taken along the line 10-10 of FIG. 8.

Referring also to FIG. 10, the holder main portion 154a of the supporting holder 154 is provided such that a pair of bottomed attachment holes 157, 158 extend parallel to each other. Each of the attachment holes 157, 158 has a circular lateral cross section, and has a front end closed and a rear end opened to the housing chamber 153. The valve housing 148 of the first oil pressure control valve 144 is formed to have a cylindrical shape with one end thereof closed with a lid member 159 and is fitted into the lower attachment hole 157 out of the attachment holes 157, 158 from a side close to the lid member 159. Moreover, the valve housing 149 of the second oil pressure control valve 146 is formed to have a cylindrical shape with one end thereof closed with a lid member 160 and is fitted into the upper attachment hole 158 out of the attachment holes 157, 158 from a side close to the lid member 160. An attachment plate 161 is engaged with the other end portions of the valve housings 148, 149 of the first and second oil pressure control valves 144, 146, which protrude from the holder main portion 154a. The attachment plate 161 is fastened to holder main portion 154a with a bolt 162 and is thus fixedly supported by the supporting holder 154 with both of the valve housings 148, 149 fitted respectively to the attachment holes 157, 158.

A damper chamber 163 is formed between the lid member 159 and the spool valve body 150 in the valve housing 148 of the first oil pressure control valve 144. A return spring 164 biasing the spool valve body 150 toward the first solenoid 145 is housed in the damper chamber 163. Moreover, a damper chamber 165 is formed between the lid member 160 and the spool valve body 151 in the valve housing 149 of the second oil pressure control valve 146. A return spring 166 biasing the spool valve body 151 toward the second solenoid 147 is housed in the damper chamber 165.

The first and second solenoids 145, 147 have plungers 167, 168, which coaxially come into contact with end portions of the spool valve bodies 150, 151 on the opposite side to the damper chambers 163, 165. The first and second solenoids 145, 147 are connected to the other end portions of the valve housings 148, 149, which protrude from the holder main portion 154a, so as to be connected serially to the first and second oil pressure control valves 144, 146 in the operating direction. Connection portions of the plungers 167, 168 to the spool valve bodies 150, 151 are housed in plunger chambers 169, 170 formed between the first and second solenoids 145, 147 and the valve housings 148, 149 of the first and second oil pressure control valves 144, 146. The plunger chambers 169, 170 communicate with the housing chamber 153.

The supporting holder 154 is attached to the inner face of the clutch cover 45 with multiple, for example five bolts 174, 174, with a flat-plate-shaped partition member 173 interposed between the supporting holder 154 and the inner face of the clutch cover 45. In a state where the supporting holder 154 is attached to the clutch cover 45, a center axis C1 of the first oil pressure control valve 144 and a center axis C2 of the second oil pressure control valve 146 extend in a front-rear direction of the vehicle-body frame F and are substantially horizontal.

The first and second solenoids 145, 147 have couplers 145a, 147a that protrude laterally with electric wires 175, 176 connected thereto. The first and second solenoids 145, 147 are connected to the first and second oil pressure control valves 144, 146 such that the couplers 145a, 147a are disposed on oblique lower or upper sides of the first and second solenoids 145, 147 in a view in the operating direction of the first and second oil pressure control valves 144, 146, i.e. a direction of the center axes C1, C2. In the embodiment, the first and second solenoids 145, 147 are connected to the first and second oil pressure control valves 144, 146 with the couplers 145a, 147a being disposed at positions such that the couplers 145a, 147a protrude obliquely downward from the first and second solenoids 145, 147 in the view in the direction of the center axes C1, C2.

Moreover, the first and second solenoids 145, 147 are connected to the first and second oil pressure control valves 144, 146 with the couplers 145a, 147a aligned in the same direction.

A recessed portion 178 forming a electric wire lead-out hole 177 between the recessed portion 178 and the supporting holder 154 is provided in an upper portion of the cover member 155. The electric wire lead-out hole 177 is used to lead the electric wires 175, 176, which are connected to the couplers 145a, 147a of the first and second solenoids 145, 147, to the outside. The electric wires 175, 176 penetrate a grommet 179, which is attached to the electric wire lead-out hole 177, in a liquid tight manner and are thus led outside.

Referring to FIG. 6, a drain port 181, an output port 182, an input port 183, and a feed-back port 184 are provided in the valve housing 148 of the first oil pressure control valve 144 with intervals, in this order from a side close to the plunger chamber 169 to a side close to the damper chamber 163. The drain port 181 communicates with the housing chamber 153, the feed-back port 184 is provided with a restriction portion 185, and the output port 182 communicates with feed-back port 184. A resultant force of the spring force of the return spring 164 and the oil pressure force generated by an oil outputted from the output port 182 and restricted by the restriction portion 185 acts on the spool valve body 150 of the first oil pressure control valve 144 in such a direction that the output port 182 communicates with the drain port 181 while being disconnected from the input port 183. Moreover, a driving force from the plunger 167 generated when electricity is supplied to the first solenoid 145 acts in such a direction that the output port 182 communicates with the input port 183 while being disconnected from the drain port 181. Hence, the hydraulic oil is outputted from the output port 182 at an oil pressure corresponding to the amount of electricity supplied to the first solenoid 145 and the hydraulic oil is discharged to the housing chamber 153 from the drain port 181, according to the operation of the first oil pressure control valve 144.

Moreover, an oil passage 186 connecting the damper chamber 163 of the first oil pressure control valve 144 and the housing chamber 153 to each other is formed in the supporting holder 154. The oil passage 186 is disposed above the center axis C1 of the first oil pressure control valve 144.

Referring to FIG. 7, a drain port 188, an output port 189, an input port 190, and a feed-back port 191 are provided in the valve housing 149 of the second oil pressure control valve 146 with intervals, in this order from a side close to the plunger chamber 170 to a side close to the damper chamber 165. The drain port 188 communicates with the housing chamber 153, the feed-back port 191 is provided with a restriction portion 192, and the output port 189 communicates with feed-back port 191. A resultant force of the spring force of the return spring 166 and the oil pressure force generated by an oil outputted from the output port 189 and restricted by the restriction portion 192 acts on the spool valve body 151 of the second oil pressure control valve 146 in such a direction that the output port 189 communicates with the drain port 188 while being disconnected from the input port 190. Moreover, a driving force from the plunger 168 generated when electricity is supplied to the second solenoid 147 acts in such a direction that the output port 189 communicates with the input port 190 while being disconnected from the drain port 188. Hence, the hydraulic oil is outputted from the output port 189 at an oil pressure corresponding to the amount of electricity supplied to the second solenoid 147 and the hydraulic oil is discharged to the housing chamber 153 from the drain port 188, according to the operation of the second oil pressure control valve 146.

Moreover, an oil passage 193 connecting the damper chamber 165 of the second oil pressure control valve 146 and the housing chamber 153 to each other is formed in the supporting holder 154. The oil passage 193 is disposed above the center axis C2 of the second oil pressure control valve 146.

The first and second oil pressure control valves 144, 146 are individually connected to the first and second hydraulic clutches 61, 62 by first and second control oil supply oil passages 196, 197. First and second cover-side supply oil passages 196a, 197a forming part of the first and second control oil supply oil passages 196, 197 are provided in the clutch cover 45 to extend to a side of the first main shaft 60 from the oil pressure control device 113 while inclining upward toward the rear. A downstream end of the first cover-side supply oil passage 196a communicates with the first oil chamber 108 communicating with the first oil pressure chamber 87 of the first hydraulic clutch 61. A downstream end of the second cover-side supply oil passage 197a communicates with the second oil chamber 109 communicating with the second oil pressure chamber 97 of the second hydraulic clutch 62.

Figure 11:
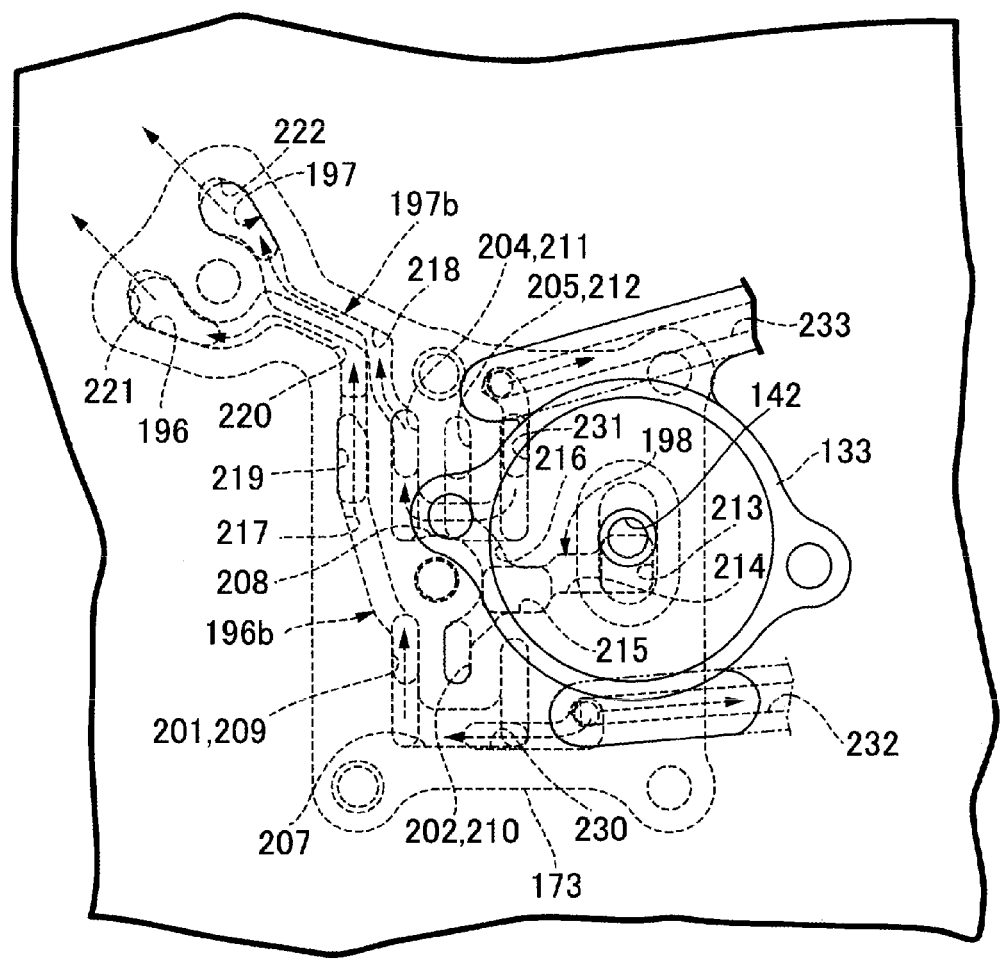
FIG. 11 is a side view of a main portion of the clutch cover.

Referring also to FIG. 11, first and second control-valve-side supply oil passages 196b, 197b individually communicating with the first and second cover-side supply oil passages 196a, 197a are formed on both faces of the partition member 173, i.e. a face of the partition member 173 on a side close to the clutch cover 45 and a face of the partition member 173 on a side close to the supporting holder 154, to form the first and second control oil supply oil passages 196, 197 together with the first and second cover-side supply oil passages 196a, 197a. Moreover, a supply oil passage 198 (see FIG. 5) extending from the first oil filter 111 to the first and second oil pressure control valves 144, 146 is formed.

Figure 12:
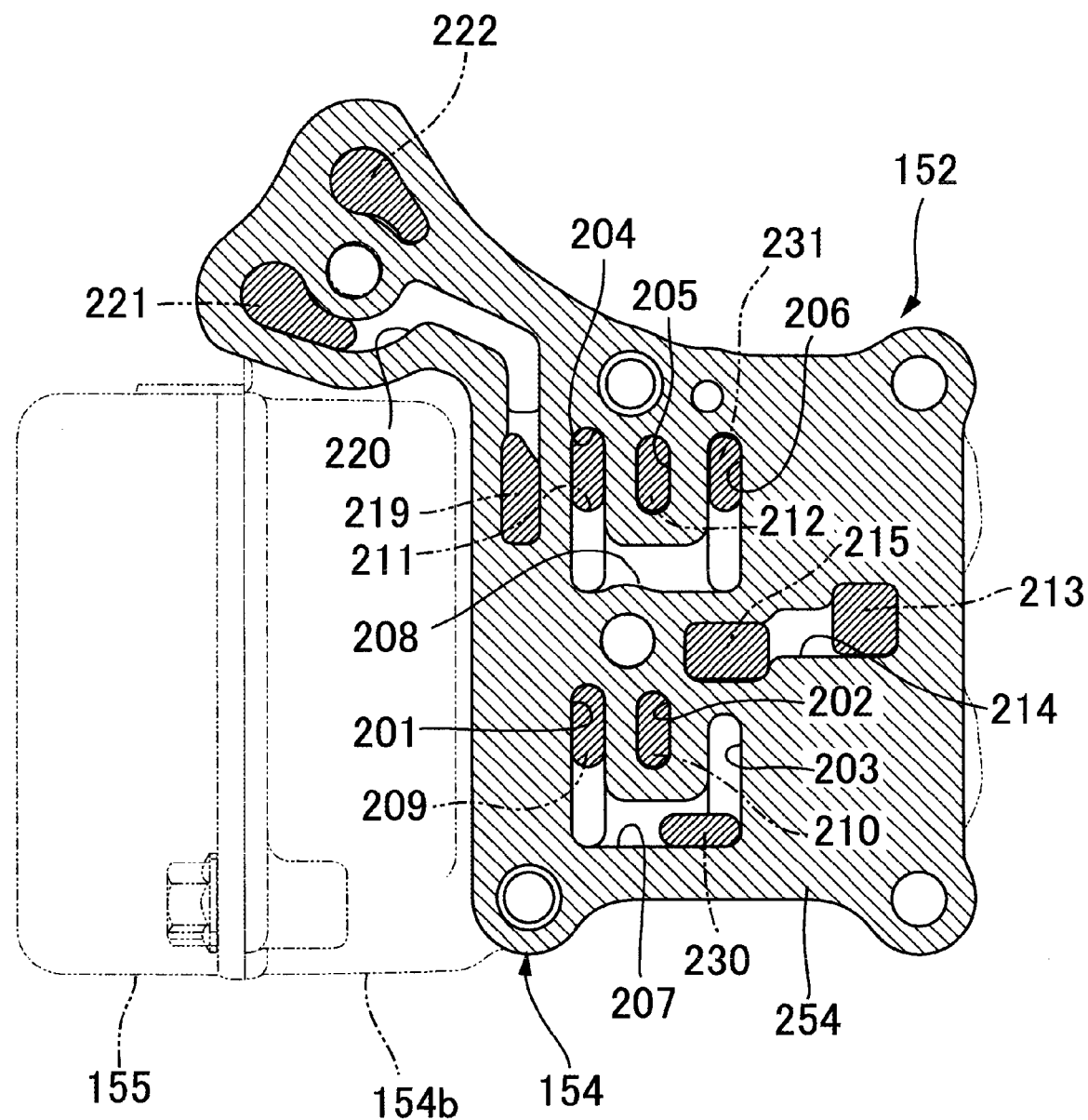
FIG. 12 is a cross-sectional view of a holder main portion of a supporting holder cut along the line 12-12 of FIGS. 6 and 7 in which communication portions with holes of a partition member are indicated by densely-hatched areas.

In FIG. 12, the holder main portion 154a of the supporting holder 154 is provided with an outlet hole 201, an inlet hole 202, and a feed-back hole 203 respectively communicating with the output port 182, the input port 183, and the feed-back port 184 of the first oil pressure control valve 144, as well as with an outlet hole 204, an inlet hole 205, and a feed-back hole 206 respectively communicating with the output port 189, the input port 190, and the feed-back port 191 of the second oil pressure control valve 146. Moreover, a groove 207 connecting the outlet hole 201 and the feed-back hole 203 to each other and a groove 208 connecting the outlet hole 204 and the feed-back hole 206 to each other are provided in the face of the supporting holder 154 which faces the partition member 173.

Figure 13:
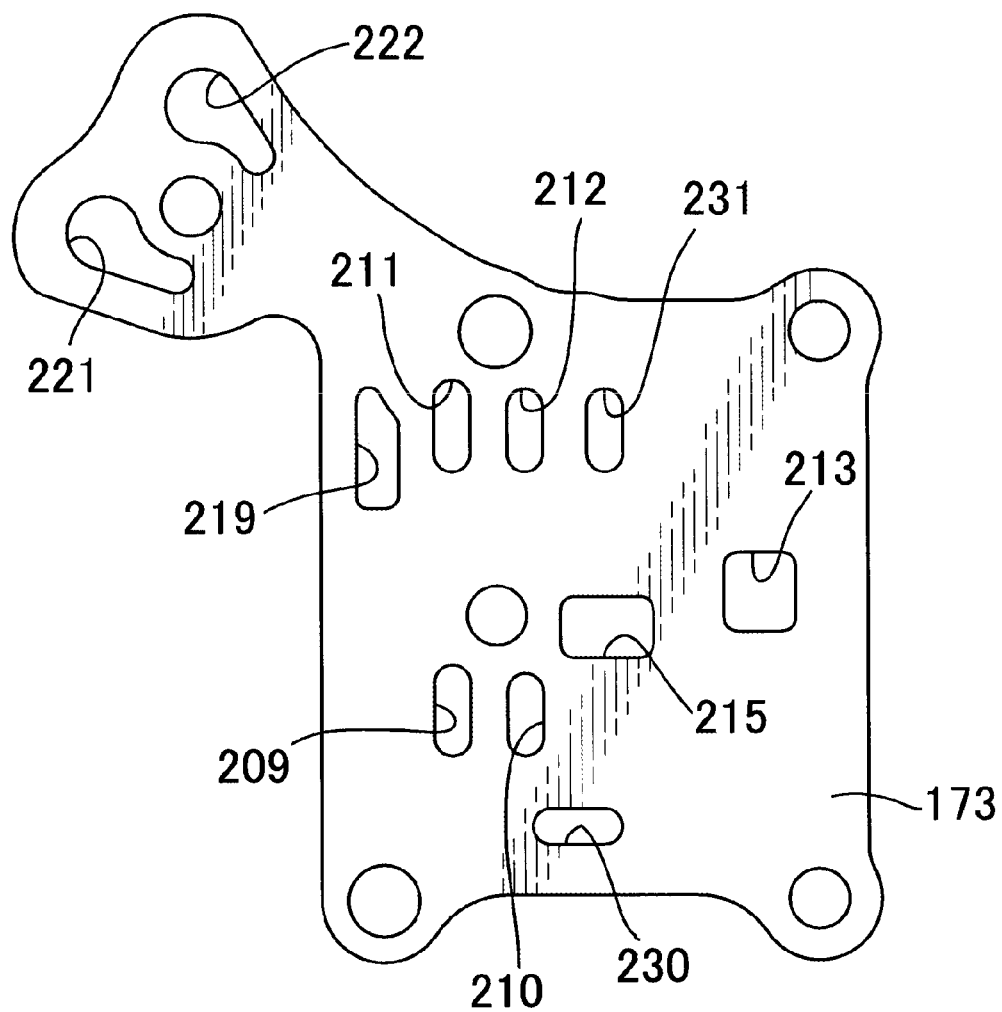
FIG. 13 is a side view of the partition member viewed from the same direction as those of FIGS. 11 and 12.

Meanwhile, as shown in FIG. 13, through holes 209, 210 corresponding to the outlet hole 201 and the inlet hole 202 provided in the supporting holder 154 on the side close to first oil pressure control valve 144 are provided in the partition board 173 to communicate with the outlet hole 201 and the inlet hole 202 as indicated by densely-hatched areas in FIG. 12, when the partition member 173 is interposed between the supporting holder 154 and the clutch cover 45. Moreover, through holes 211, 212 corresponding to the outlet hole 204 and the inlet hole 205 provided in the supporting holder 154 on the side close to second oil pressure control valve 146 are provided in the partition board 173 to communicate with the outlet hole 204 and the inlet hole 205, as indicated by densely-hatched areas in FIG. 12, when the partition member 173 is interposed between the supporting holder 154 and the clutch cover 45.

Furthermore, the partition member 173 is provided with a through hole 213 communicating with the outlet passage 142 of the first oil filter 111 and a through hole 215 communicating with a groove 214 provided in the face of the supporting holder 154 facing the partition member 173, the groove 214 provided in such a manner that the one end communicates with the through hole 213 and the other end communicates with the through hole 215. As shown in FIGS. 5 and 11, a groove 216, curved such that the through hole 215 communicates with the through holes 210, 212, is provided in the face of the clutch cover 45 facing the partition member 173.

Accordingly, the supply oil passage 198 from the first oil filter 111 to the first and second oil pressure control valves 144, 146 is formed of the through hole 213 of the partition member 173, the groove 214 of the supporting holder 154, the through hole 215 of the partition member 173, the groove 216 of the clutch cover 45, the through holes 210, 212 of the partition member 173, and the inlet holes 202, 205 of the supporting holder 154.

A groove 217 communicating with the outlet hole 201 of the supporting holder 154 via the through hole 209 of the partition member 173 is provided in the face of the clutch cover 45 facing the partition member 173. The groove 217 communicates with a through hole 219 provided in the partition member 173. Moreover, a groove 220, whose one end communicates with the through hole 219, is provided in the face of the supporting holder 154 facing the partition member 173. A through hole 221 communicating with the other end of the groove 220 is provided in the partition member 173. The through hole 221 communicates with the first cover-side supply oil passage 196a. In other words, the first control-valve-side supply oil passage 196b is formed of the through hole 209 of the partition member 173, the groove 217 of the clutch cover 45, the through hole 219 of the partition member 173, the groove 220 of the supporting holder 154, and the through hole 221 of the partition member 173, and the first control-valve-side supply oil passage 196b is formed between one surface of the partition member 173 and the face of the supporting holder 154 facing the partition member 173 as well as between the other surface of the partition member 173 and the face of the clutch cover 45 facing the partition member 173.

Moreover, a groove 218, whose one end communicates with the outlet hole 204 of the supporting holder 154 via the through hole 211 of the partition member 173, is provided in the face of the clutch cover 45 facing the partition member 173. A through hole 222 communicating with the other end of the groove 218 is provided in the partition member 173. The through hole 222 communicates with the second cover-side supply oil passage 197a. In other words, the second control-valve-side supply oil passage 197b is formed of the through hole 211 of the partition member 173, the groove 218 of the clutch cover 45, and the through hole 222 of the partition member 173, and the second control-valve-side supply oil passage 197b is formed between the face of the clutch cover 45 facing the partition member 173 and the face of the partition member 173 facing the clutch cover 45.

The partition member 173 is provided with through holes 230, 231 communicating with the grooves 207, 208 provided in the supporting holder 154. The clutch cover 45 is provided with a first detection oil passage 232 communicating with the groove 207, i.e. the output port 182 of the first oil pressure control valve 144 via the through hole 230 and a second detection oil passage 233 communicating with the output port 189 of the second oil pressure control valve 146 via the through hole 231. The first oil pressure sensor 115, which detects the oil pressure of the first detection oil passage 232, and the second oil pressure 116, which detects the oil pressure of the second detection oil passage 233, are disposed on the clutch cover 45.

Figure 14:
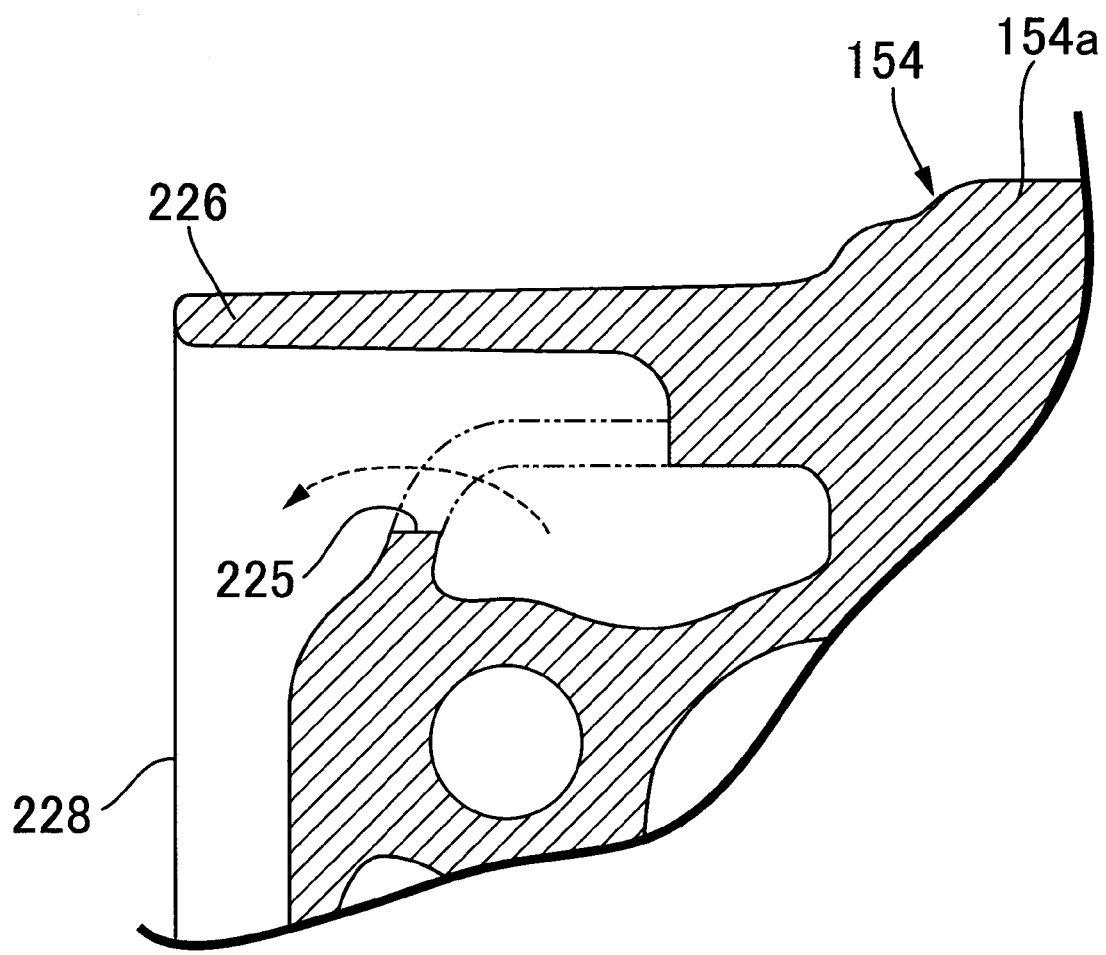
FIG. 14 is an enlarged cross-sectional view taken along the line 14-14 of FIG. 8.
Figure 15:
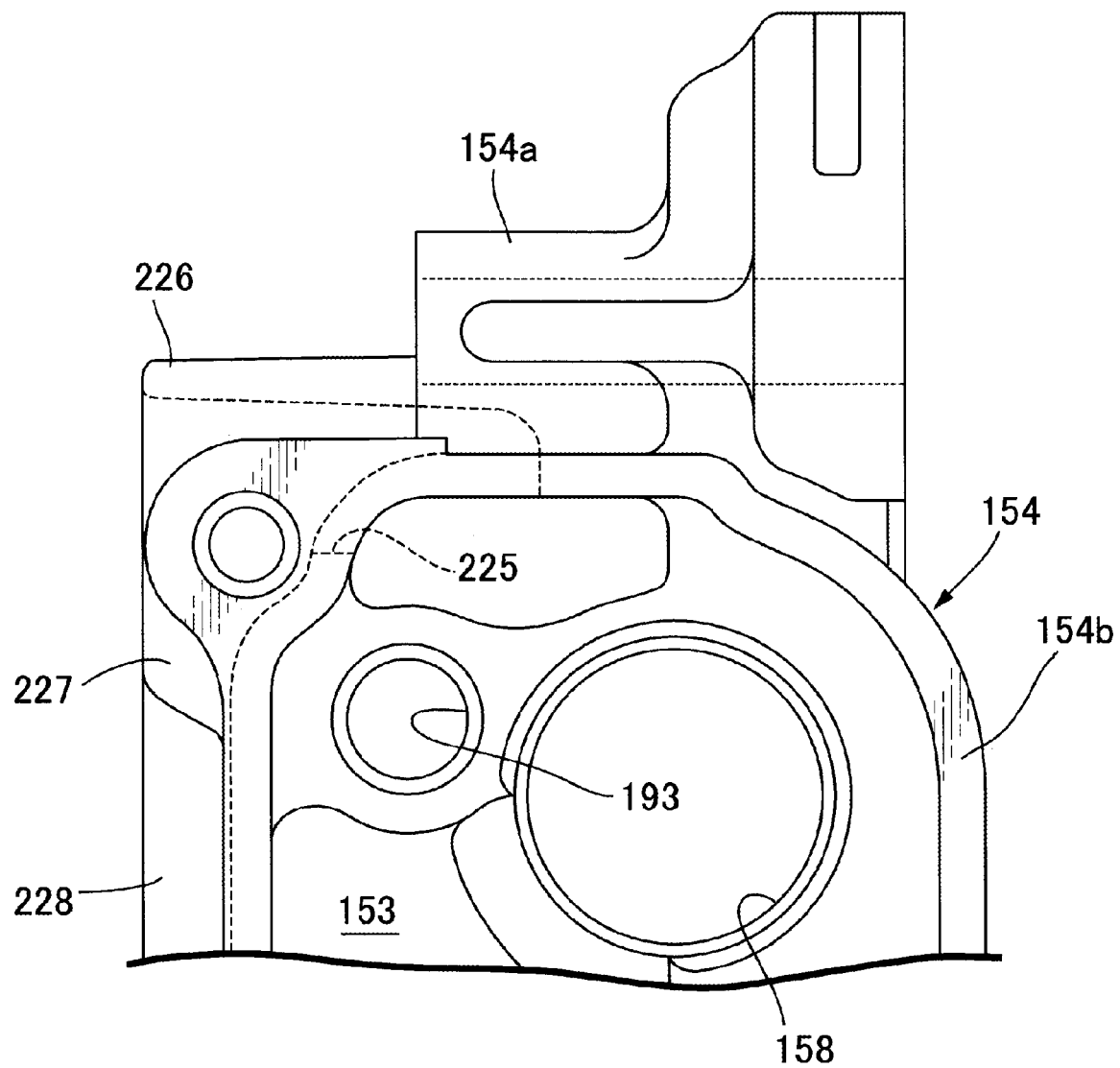
FIG. 15 is a view of part of the supporting holder viewed from a side close to a cover member.

Referring also to FIGS. 14 and 15, an oil return hole 225 for retuning excessive hydraulic oil from the housing chamber 153 into the engine main body 18 is provided in the housing chamber forming body 152 to communicate with an upper portion of the housing chamber 153 at an end portion of the housing chamber 153 on a side close to the first and second oil pressure control valves 144, 146, the housing chamber forming body 152 attached to the inner face side of the clutch cover 45 in the engine main body 18.

The oil return hole 225 is formed to open upward and laterally in an upper portion of the supporting holder 154 forming the housing chamber forming body 152 together with the cover member 155. The oil return hole 225 is formed by cutting away part of the supporting holder 154.

An eaves portion 226 covering the oil return hole 225 from above protrudes integrally from the supporting holder 154. A pair of ribs 227, 228 extending vertically with the oil return hole 225 interposed therebetween in a front rear direction protrude integrally from the supporting holder 154 with the upper ends thereof being integrally continuous with the eaves portion 226.

The first and second oil pressure control valves 144, 146 individually corresponding to the first and second hydraulic clutches 61, 62 are disposed parallel to each other in the supporting holder 154 in a direction along the front-rear direction of the vehicle-body frame F. At least one of the pair of ribs 227, 228 (the rib 228 in the embodiment) protrudes integrally from the supporting holder 154 to extend over both of the oil pressure control valves 144, 146.

Next, operations of the embodiment are described. The housing chamber 153 housing the first and second solenoids 145, 147 is formed in the housing chamber forming body 152 attached to the inner face side of the clutch cover 45 forming part of the engine main body 18, the first and second oil pressure control valves 144, 146 partially facing the housing chamber 153 are supported by the housing chamber forming body 152, and the oil return hole 225 for returning excessive hydraulic oil from the housing chamber 153 into the engine main body 18 is provided in the housing chamber forming body 152 to communicate with the upper portion of the housing chamber 153 at the end portion of the housing chamber 153 on the side close to the first and second oil pressure control valves 144, 146. Accordingly, an oil level of the hydraulic oil is less likely to be low on the side close to the first and second oil pressure control valves 144, 146 even when the vehicle body inclines frontward or rearward. Hence, the exposure of the first and second oil pressure control valves 144, 146 above the oil level can be suppressed without increasing the size of the housing chamber 153. Thus, the increase in size of the engine main body 18 can be avoided.

Here, with reference to FIG. 8, assume a case where the vehicle body inclines upward toward the front while climbing a slope or the like. When the oil level of the hydraulic oil in the housing chamber 153 is at a position shown by a chain line LF of FIG. 8, there is a possibility of outside air entering the plunger chamber 170 of the second oil pressure control valve 146 from the oil return hole 225. However, the position shown by the chain line LF is a state where the vehicle body inclines upward toward the front at 70°, for example, and such a state does not occur in normal travelling. Accordingly, the exposure of the first and second oil pressure control valves 144, 146 above the oil level can be suppressed. Moreover, assume a case where the vehicle body inclines upward toward the rear while descending a slope or the like. When the oil level of the hydraulic oil in the housing chamber 153 is at a position shown by a chain line LR of FIG. 8, there is a possibility of outside air entering the plunger chamber 170 of the second oil pressure control valve 146 from the oil return hole 225. However, the position shown by the chain line LR is a state where the vehicle body inclines upward toward the rear at 54°, for example, and such a state does not occur in normal travelling. Accordingly, the exposure of the first and second oil pressure control valves 144, 146 above the oil level can be suppressed.

Moreover, the housing chamber forming body 152 is formed of: the supporting holder 154 attached to the clutch cover 45 with the first and second oil pressure control valves 144 fitted to and supported by the clutch cover 45; and the cover member 155 attached to the supporting holder 154 to form the housing chamber 153 between the cover member 155 and the supporting holder 154, and the part of the supporting holder 154 is cut away to form the oil return hole 225 opening upward and laterally in the upper portion of the supporting holder 154. Accordingly, the oil return hole 225 can be easily formed by machining or molding.

Furthermore, the first and second oil pressure control valves 144, 146 include the valve housings 148, 149 fitted and fixed to the supporting holder 154 and the spool valve bodies 150, 151 slidably fitted to the valve housings 148, 149 and are thus configured to be of a spool-type. In addition, the oil passage 186, 193 are disposed above the center axes C1, C2 of the first and second oil pressure control valves 144, 146, the oil passages 186, 193 formed in the supporting holder 154 and connecting the housing chamber 153 and the damper chambers 163, 165 formed on the opposite side to the first and second solenoids 145, 147 driving the first and second oil pressure control valves 144, 146, between the valve housings 148, 149 and the spool valve bodies 150, 151. Accordingly, air from the damper chambers 163, 165 is more likely to be discharged to the outside from oil return hole 225 via the housing chamber 153.

Moreover, the eaves portion 226 covering the oil return hole 225 from above protrudes integrally from the supporting holder 154. This prevents the oil falling from above the supporting holder 154 from entering the oil return hole 225 and thereby causing the discharge property of the hydraulic oil from the oil return hole to deteriorate.

In addition, the pair of ribs 227, 228 extend vertically with the oil return hole 225 interposed therebetween in a front rear direction protrude integrally from the supporting holder 154 with the upper ends thereof being integrally continuous with the eaves portion 226. Accordingly, the supporting holder 154 can be reinforced in a portion where the oil return hole 225 is disposed. In addition, the hydraulic oil from the oil return hole 225 can be led downward and discharged in an excellent manner.

Furthermore, the first and second oil pressure control valves 144, 146 individually corresponding to the first and second hydraulic clutches 61, 62 are disposed parallel to each other in the supporting holder 154 and at least one of the pair of ribs 227, 228 (the rib 228 in the embodiment) protrudes integrally from the supporting holder 154 to extend both of the oil pressure control valves 144, 146. Accordingly, the supporting holder 154 can be reinforced in a portion where the pair of the oil pressure control valves 144, 146 are disposed.

Moreover, the first and second solenoids 145, 147 having the couplers 145a, 147a, which protrude laterally with the electric wires 175, 176 connected thereto, are connected to the first and second oil pressure control valves 144, 146 such that the couplers 145a, 147a are disposed on the oblique lower or upper sides of the first and second solenoids 145, 147 in the view in the operation axis direction of the first and second oil pressure control valves 144, 146. Accordingly, it is possible to prevent the couplers 145a, 147a from largely protruding from the first and second solenoids 145, 147 in the up-down direction and in the right-left direction and to effectively use a dead space in the housing chamber 153 to dispose the couplers 145a, 147a.

Furthermore, the first and second solenoids 145, 147 individually connected to the first and second oil pressure control valves 144, 146 are connected to the first and second oil pressure control valves 144, 146 with the couplers 145a, 147a aligned in the same direction. Accordingly, the first and second solenoids 145, 147 are housed in the housing chamber 153 in a space efficient manner while interference between the couplers 145a, 147a is avoided.

Moreover, the recessed portion 178 forming the electric wire lead-out hole 177 between the recessed portion 178 and the supporting holder 154 is provided in the cover member 155 forming the housing chamber forming body 152 together with the supporting holder 154, the electric wire lead-out hole 177 used to lead the electric wires 175, 176 connected to the first and second solenoids 145, 147 to the outside. Accordingly, deterioration in stiffness of the supporting holder 154 can be suppressed compared to the case where the electric wire lead-out hole is provided in the supporting holder 154, in addition to the oil return hole 225.

The embodiment of the present invention has been described above. However, the present invention is not limited to the embodiment described above and various design changes can be made without departing from the present invention described in the scope of claims.

EXPLANATION OF THE REFERENCE NUMERALS

18 ENGINE MAIN BODY
61, 62 HYDRAULIC CLUTCH
144, 146 OIL PRESSURE CONTROL VALVE
145, 147 SOLENOID BEING ACTUATOR
145a, 147a COUPLER
148, 149 VALVE HOUSING
150, 151 SPOOL VALVE BODY
152 HOUSING CHAMBER FORMING BODY
153 HOUSING CHAMBER
154 SUPPORTING HOLDER
155 COVER MEMBER
163, 165 DAMPER CHAMBER
175, 176 ELECTRIC WIRE
177 ELECTRIC WIRE LEAD-OUT HOLE
178 RECESSED PORTION
186, 193 OIL PASSAGE
225 OIL RETURN HOLE
226 EAVES PORTION
227, 228 RIB
C1, C2 CENTER AXIS OF OIL PRESSURE CONTROL VALVE
E INTERNAL COMBUSTION ENGINE
F VEHICLE-BODY FRAME
P POWER UNIT

What is claimed is:

1. A hydraulic clutch control device for a hydraulic clutch of a power transmission system of a vehicle power unit, the vehicle power unit including an internal combustion engine having an engine main body mounted on a vehicle-body frame, the hydraulic clutch control device comprising:
an oil pressure control valve and an actuator disposed in the engine main body, the oil pressure control valve being capable of controlling an oil pressure of the hydraulic clutch and arranged to have an operating direction extending in a front-rear direction of the vehicle-body frame, the actuator being serially connected to the oil pressure control valve in the operating direction to drive the oil pressure control valve;
a housing chamber that houses at least the actuator and is filled with hydraulic oil, the housing chamber being formed in a housing chamber forming body attached to the engine main body and the oil pressure control valve partially facing the housing chamber being supported by the housing chamber forming body, the housing chamber forming body including a supporting holder that is attached to the engine main body with the oil pressure control valve being fitted to and supported by the supporting holder; and
an oil return hole used to return an excessive portion of the hydraulic oil from the housing chamber into the engine main body is provided in the housing chamber forming body to communicate with an upper portion of the housing chamber at an end portion of the housing chamber on a side close to the oil pressure control valve, wherein part of the supporting holder is cut away to form the oil return hole opening upward and laterally in an upper portion of the supporting holder and an eaves portion covering the oil return hole from above protrudes integrally from the supporting holder.

2. The hydraulic clutch control device of the vehicle power unit according to claim 1, wherein
the housing chamber forming body includes a cover member that is attached to the supporting holder to form the housing chamber between the cover member and the supporting holder.

3. The hydraulic clutch control device of the vehicle power unit according to claim 2, wherein
the oil pressure control valve includes a valve housing fitted and fixed to the supporting holder and a spool valve body slidably fitted to the valve housing and is thus configured to be a spool type, and
an oil passage is disposed above a center axis of the oil pressure control valve, the oil passage being formed in the supporting holder and connecting the housing chamber and a damper chamber formed on an opposite side to the actuator, between the valve housing and the spool valve body.

4. The hydraulic clutch control device of the vehicle power unit according to claim 3, wherein the actuator has a coupler that protrudes laterally and to which an electric wire is connected, the coupler protruding obliquely upward or obliquely downward from the actuator in a view in an operation axis direction of the oil pressure control valve.

5. The hydraulic clutch control device of the vehicle power unit according to claim 4, wherein paired actuators are individually connected to paired oil pressure control valves that are disposed parallel to each other in the supporting holder and that individually correspond to paired hydraulic clutches inserted in the power transmission system are connected respectively to the oil pressure control valves with the couplers of the actuators arranged in the same direction.

6. The hydraulic clutch control device of the vehicle power unit according to claim 2, wherein paired ribs extending vertically with the oil return hole interposed therebetween in a front-rear direction protrude integrally from the supporting holder with upper ends of the ribs being integrally continuous with the eaves portion.

7. The hydraulic clutch control device of the vehicle power unit according to claim 6, wherein
paired oil pressure control valves individually corresponding to paired hydraulic clutches inserted in the power transmission system are arranged parallel to each other in the supporting holder, and
at least one of the paired ribs protrudes integrally from the supporting holder to extend over both of the oil pressure control valves.

8. The hydraulic clutch control device of the vehicle power unit according to claim 7, wherein the actuator has a coupler that protrudes laterally and to which an electric wire is connected, the coupler protruding obliquely upward or obliquely downward from the actuator in a view in an operation axis direction of the oil pressure control valve.

9. The hydraulic clutch control device of the vehicle power unit according to claim 6, wherein the actuator has a coupler that protrudes laterally and to which an electric wire is connected, the coupler protruding obliquely upward or obliquely downward from the actuator in a view in an operation axis direction of the oil pressure control valve.

10. The hydraulic clutch control device of the vehicle power unit according to claim 9, wherein paired actuators are individually connected to paired oil pressure control valves that are disposed parallel to each other in the supporting holder and that individually correspond to paired hydraulic clutches inserted in the power transmission system are connected respectively to the oil pressure control valves with the couplers of the actuators arranged in the same direction.

11. The hydraulic clutch control device of the vehicle power unit according to claim 2, wherein the actuator has a coupler that protrudes laterally and to which an electric wire is connected, the coupler protruding obliquely upward or obliquely downward from the actuator in a view in an operation axis direction of the oil pressure control valve.

12. The hydraulic clutch control device of the vehicle power unit according to claim 11, wherein paired actuators are individually connected to paired oil pressure control valves that are disposed parallel to each other in the supporting holder and that individually correspond to paired hydraulic clutches inserted in the power transmission system are connected respectively to the oil pressure control valves with the couplers of the actuators arranged in the same direction.

13. The hydraulic clutch control device of the vehicle power unit according to claim 1, wherein the actuator has a coupler that protrudes laterally and to which an electric wire is connected, the coupler protruding obliquely upward or obliquely downward from the actuator in a view in an operation axis direction of the oil pressure control valve.

14. The hydraulic clutch control device of the vehicle power unit according to claim 13, wherein paired actuators are individually connected to paired oil pressure control valves that are disposed parallel to each other in the supporting holder and that individually correspond to paired hydraulic clutches inserted in the power transmission system are connected respectively to the oil pressure control valves with the couplers of the actuators arranged in the same direction.

15. The hydraulic clutch control device of the vehicle power unit according to claim 1, wherein paired ribs extending vertically with the oil return hole interposed therebetween in a front-rear direction protrude integrally from the supporting holder with upper ends of the ribs being integrally continuous with the eaves portion.

16. The hydraulic clutch control device of the vehicle power unit according to claim 15, wherein
paired oil pressure control valves individually corresponding to paired hydraulic clutches inserted in the power transmission system are arranged parallel to each other in the supporting holder, and
at least one of the paired ribs protrudes integrally from the supporting holder to extend over both of the oil pressure control valves.

17. A hydraulic clutch control device for a hydraulic clutch of a power transmission system of a vehicle power unit, the vehicle power unit including an internal combustion engine having an engine main body mounted on a vehicle-body frame, the hydraulic clutch control device comprising:
an oil pressure control valve disposed in the engine main body, wherein the oil pressure control valve controls an oil pressure of the hydraulic clutch and is arranged to have an operating direction extending in a front-rear direction of the vehicle-body frame;
an actuator disposed in the engine main body, wherein the actuator is serially connected to the oil pressure control valve in the operating direction to drive the oil pressure control valve, and wherein the actuator has a coupler that protrudes laterally and to which an electric wire is connected, the coupler protruding obliquely upward or obliquely downward from the actuator in a view in an operation axis direction of the oil pressure control valve;
a housing chamber that houses at least the actuator and is filled with hydraulic oil, the housing chamber being formed in a housing chamber forming body attached to the engine main body and the oil pressure control valve partially facing the housing chamber being supported by the housing chamber forming body, and
an oil return hole used to return an excessive portion of the hydraulic oil from the housing chamber into the engine main body is provided in the housing chamber forming body to communicate with an upper portion of the housing chamber at an end portion of the housing chamber on a side close to the oil pressure control valve.

18. The hydraulic clutch control device of the vehicle power unit according to claim 17,
wherein the housing chamber forming body includes a supporting holder that is attached to the engine main body with the oil pressure control valve being fitted to and supported by the supporting holder,
wherein the oil pressure control valve includes a valve housing fitted and fixed to the supporting holder and a spool valve body slidably fitted to the valve housing and is thus configured to be a spool type, and
an oil passage is disposed above a center axis of the oil pressure control valve, the oil passage being formed in the supporting holder and connecting the housing chamber and a damper chamber formed on an opposite side to the actuator, between the valve housing and the spool valve body.

19. A hydraulic clutch control device for a hydraulic clutch of a power transmission system of a vehicle power unit, the vehicle power unit including an internal combustion engine having an engine main body mounted on a vehicle-body frame, the hydraulic clutch control device comprising:
an oil pressure control valve disposed in the engine main body, wherein the oil pressure control valve controls an oil pressure of the hydraulic clutch and is arranged to have an operating direction extending in a front-rear direction of the vehicle-body frame;
an actuator disposed in the engine main body, wherein the actuator is serially connected to the oil pressure control valve in the operating direction to drive the oil pressure control valve;
a housing chamber that houses at least the actuator and is filled with hydraulic oil, the housing chamber being formed in a housing chamber forming body attached to the engine main body and the oil pressure control valve partially facing the housing chamber being supported by the housing chamber forming body, the housing chamber forming body including a supporting holder that is attached to the engine main body with the oil pressure control valve being fitted to and supported by the supporting holder;
an oil return hole used to return an excessive portion of the hydraulic oil from the housing chamber into the engine main body is provided in the housing chamber forming body to communicate with an upper portion of the housing chamber at an end portion of the housing chamber on a side close to the oil pressure control valve, wherein part of the supporting holder is cut away to form the oil return hole opening upward and laterally in an upper portion of the supporting holder; and an eaves portion protrudes from the supporting holder and covers the oil return hole from above, wherein paired ribs extending vertically with the oil return hole interposed therebetween in a front-rear direction protrude integrally from the supporting holder with upper ends of the ribs being integrally continuous with the eaves portion.

* * * * *